United States Patent
Yamazaki et al.

(10) Patent No.: US 8,610,405 B2
(45) Date of Patent: Dec. 17, 2013

(54) CHARGE AND DISCHARGE CIRCUIT OF SECONDARY BATTERY AND BATTERY PACK

(75) Inventors: Kazuo Yamazaki, Atsugi (JP); Hidenori Tanaka, Atsugi (JP); Yukihiro Terada, Atsugi (JP); Tamiji Nagai, Kawasaki (JP); Toshio Nagai, legal representative, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 483 days.

(21) Appl. No.: 12/308,335

(22) PCT Filed: Jun. 14, 2007

(86) PCT No.: PCT/JP2007/061973
§ 371 (c)(1),
(2), (4) Date: Oct. 12, 2010

(87) PCT Pub. No.: WO2007/145268
PCT Pub. Date: Dec. 21, 2007

(65) Prior Publication Data
US 2011/0074356 A1 Mar. 31, 2011

(30) Foreign Application Priority Data
Jun. 15, 2006 (JP) .................................. 2006-165716

(51) Int. Cl.
*H02J 7/00* (2006.01)
(52) U.S. Cl.
USPC .......................................... 320/134; 320/136
(58) Field of Classification Search
USPC .......................................................... 320/134
See application file for complete search history.

(56) References Cited

U.S. PATENT DOCUMENTS

| 5,680,027 | A | 10/1997 | Hiratsuka et al. |
| 6,268,713 | B1 * | 7/2001 | Thandiwe ...................... 320/134 |
| 6,885,168 | B2 * | 4/2005 | Okumura et al. ............. 320/135 |
| 6,977,513 | B2 * | 12/2005 | Matsunaga ................... 320/134 |

(Continued)

FOREIGN PATENT DOCUMENTS

| JP | 06-245543 A | 9/1994 |
| JP | 06-266457 A | 9/1994 |

(Continued)

OTHER PUBLICATIONS

Chinese Office Action dated Mar. 23, 2011 (and English translation thereof) in counterpart Chinese Application No. 200780022021.1.

(Continued)

*Primary Examiner* — Edward Tso
*Assistant Examiner* — Robert Grant
(74) *Attorney, Agent, or Firm* — Holtz, Holtz, Goodman & Chick, PC

(57) ABSTRACT

A charge and discharge circuit and a battery pack, both capable of voluntarily perform proper switching between a charge operation and a discharge operation of a secondary battery according to various situations, are provided. The charge and discharge circuit of a secondary battery is one capable of charging the secondary battery E2 by a power source voltage and of supplying power from the secondary battery E2 to an external device 3. Then, the charge and discharge circuit includes a bidirectional regulator 10 capable of adjusting an output in both of a charge direction of feeding the current to the side of the secondary battery E2 and a discharge direction of feeding the current from the secondary battery E2 to the side of the external device 3, a charge and discharge detecting circuit 20 for detecting a direction of the current flowing in the secondary battery E2, and a switching control circuit 30 for switching the operation direction of the bidirectional regulator 10 based on the detection of the charge and discharge detecting circuit 20.

6 Claims, 19 Drawing Sheets

(56) References Cited

U.S. PATENT DOCUMENTS

2003/0193318 A1* 10/2003 Ozawa et al. .................. 320/132
2005/0162131 A1* 7/2005 Sennami et al. .............. 320/128

FOREIGN PATENT DOCUMENTS

| | | |
|---|---|---|
| JP | 2002-017040 A | 1/2002 |
| JP | 2003-304644 A | 10/2003 |
| JP | 2005-229693 A | 8/2005 |

OTHER PUBLICATIONS

Japanese Office Action dated May 15, 2012 (and English translation thereof) in counterpart Japanese Application No. 2006-165716.

* cited by examiner

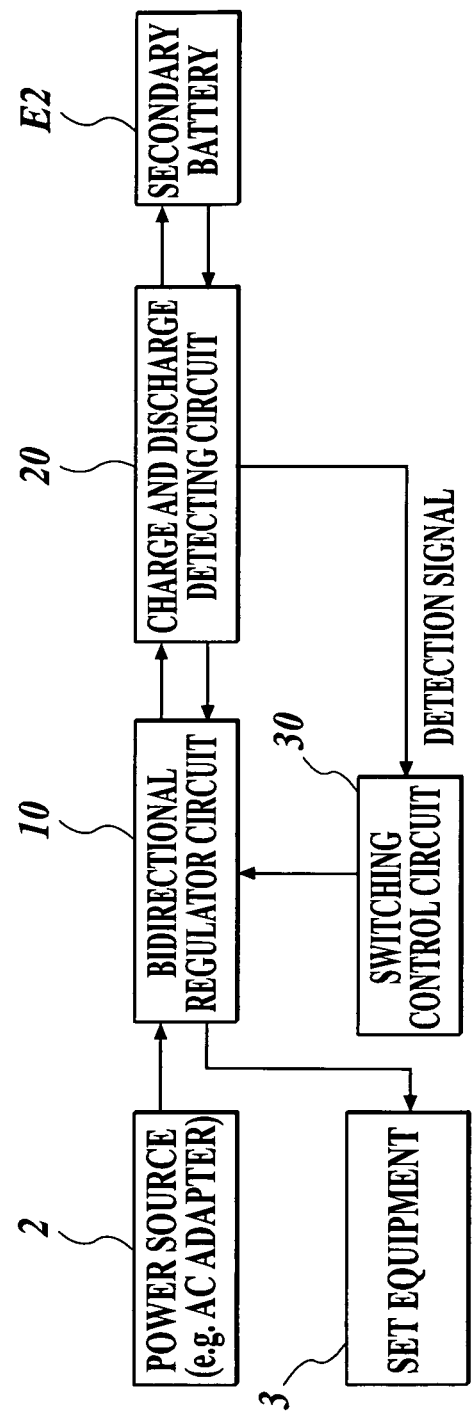

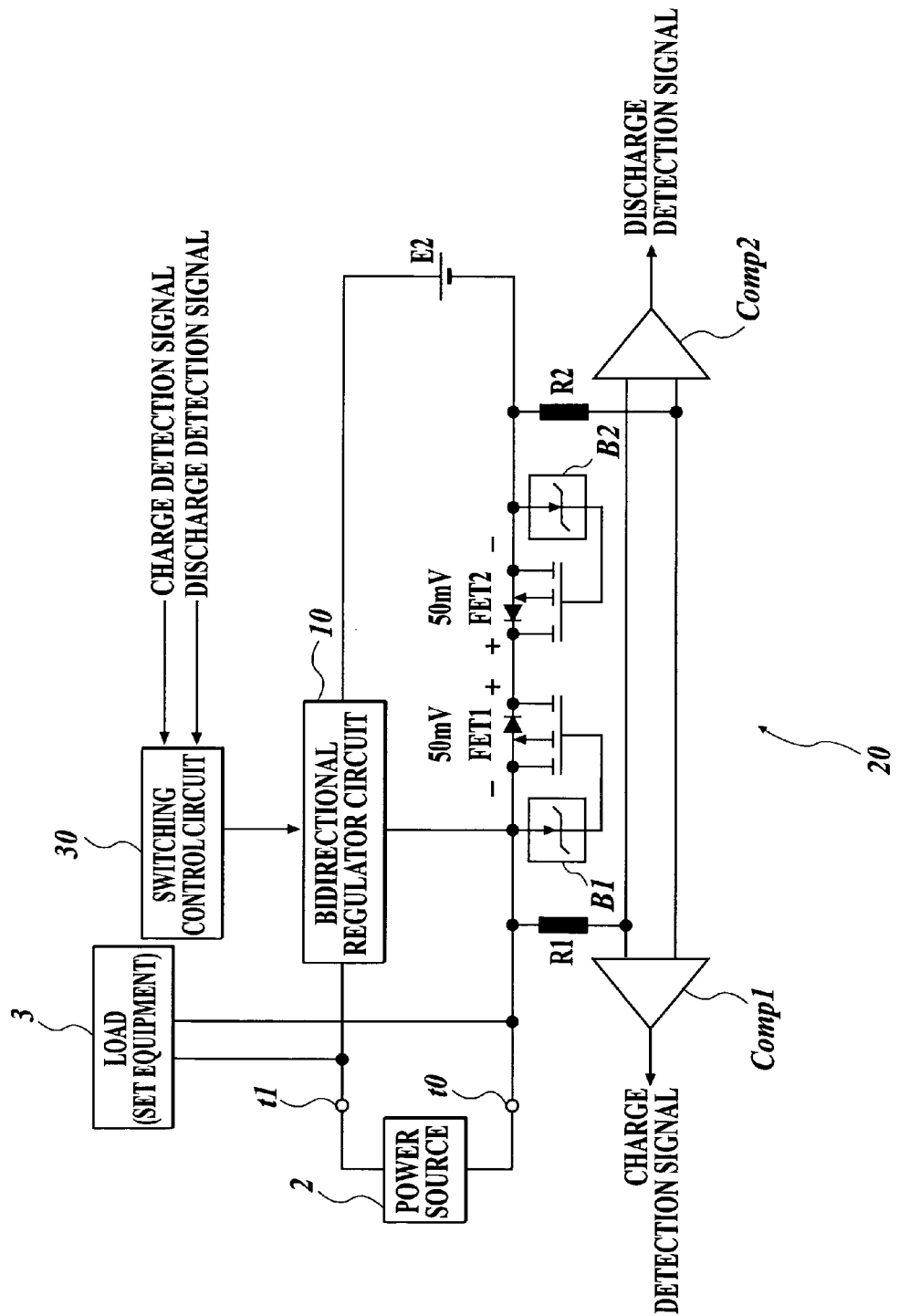

100 (BATTERY PACK)

CHARGE AND DISCHARGE CIRCUIT AND
PROTECTION CIRCUIT ARE INCORPORATED 101
(INPUT AND OUTPUT TERMINAL)

CHARGE AND DISCHARGE CIRCUIT OF SECONDARY BATTERY AND BATTERY PACK

This application is a U.S. National Phase Application under 35 USC 371 of International Application PCT/JP2007/061973 filed Jun. 14, 2007.

TECHNICAL FIELD

The present invention relates to a charge and discharge circuit of a secondary battery, such as a lithium ion battery, for making the secondary battery perform charge and discharge, and to a battery pack made by packaging the secondary battery.

BACKGROUND ART

For example, in a system, such as a portable telephone and some digital cameras, which enables the charge of the apparatus with a secondary battery remaining being loaded therein, it is general that a charge and discharge circuit 5 is provided with a bidirectional regulator circuit 120 as shown in FIG. 19, and that the bidirectional regulator circuit 120 adjusts a current and a voltage at the time of charge and discharge. Moreover, the switching between the charge operation and the discharge operation of the bidirectional regulator circuit 120 is generally performed based on the switched states of the terminals for the connection with a power source device 2 and set equipment 3 of a power supply destination. That is, if the power source device 2 is connected to the charge and discharge circuit 5 based on the switched state of a terminal connection switching circuit 110, then the bidirectional regulator circuit 120 is made to perform a charge operation; and if the power source device 2 is not connected, then the bidirectional regulator circuit 120 is made to perform a discharge operation.

Moreover, the following techniques were disclosed as the related art of the present invention. For example, Patent publication 1 disclosed the technique of performing the charge of an auxiliary power source (secondary battery) by the use of a bidirectional converter when the electric power of a main power source was superfluous, and of performing the discharge of the auxiliary power source at the starting time of a system, when the electric power of the main power source was insufficient, in a power source device for performing power supply from the main power source and the auxiliary power source.

Moreover, Patent Publication 2 disclosed the technique of connecting a bidirectional converter at the preceding stage of a battery to make the bidirectional converter perform a charge operation and a discharge operation based on a discharge instruction and a charge instruction in a photovoltaic power generating provision connecting a solar cell, the battery, and a load with one another.

Moreover, Patent Publication 3 disclosed a bidirectional converter to perform the charge of a battery as a step-down chopper circuit at the time of charge, and to perform the discharge of the battery as a step-up chopper circuit at the time of discharge.

Patent Publication 1: Japanese Laid-Open Publication No. H6-245543
Patent Publication 2: Japanese Patent Application No. H5-055467
Patent Publication 3: Japanese Laid-Open Publication No. 2003-304644

DISCLOSURE OF THE INVENTION

The Problems to be Solved by the Invention

As described above, the charge and discharge circuits in each of which a bidirectional regulator is connected to a secondary battery to perform the switching between the charge of the secondary battery and the discharge of the secondary battery have existed for some time. However, some of the conventional charge and discharge circuits perform the switching under a uniform condition, such as the existence of power source connection, and some of them need an external instruction for performing the switching between the charge operation and the discharge operation.

The inventors of the present application thought that it became possible to apply a secondary battery easily to various convenient uses if a charge and discharge circuit was made to voluntarily perform the proper switching between a charge operation and a discharge operation of the secondary battery according to various situations without depending on any external instruction.

It is an object of the present invention to provide a charge and discharge circuit capable of performing the proper switching between a charge operation and a discharge operation of a secondary battery voluntarily according to various situations.

Means of Solving the Problem

In order to attain the object mentioned above, the present invention is a charge and discharge circuit of a secondary battery, the charge and discharge circuit capable of charging the secondary battery by a power source voltage and of supplying power from the secondary battery to an external device, the circuit comprising a bidirectional regulator capable of adjusting a current or a voltage in both of a charge direction of feeding the current to a secondary battery side and a discharge direction of feeing the current from the secondary battery to an external device side, a charge and discharge detecting circuit for detecting a direction of the current flowing in the secondary battery, and a switching control circuit for switching an operation direction of the bidirectional regulator into the charge direction or the discharge direction based on a detection result of the charge and discharge detecting circuit.

By such method, the direction of a current flowing through the secondary battery changes in a small measure if the connection state of a power source and an external load change and the immediately preceding operation state of the bidirectional regulator cannot be maintained, for example, in such cases where a power source device, such as an AC adapter, is connected to a power source terminal in a state in which the charging rate of the secondary battery is low, and where the insufficiency of power supply is caused owing to a temporarily increase of the load of the external device in the state in which the power source device is connected, and where the connection of the power source device is taken off. Then, it is possible to detect the change to voluntarily switch the subsequent operation state of the bidirectional regulator. Moreover, because the change of the current direction at this time indicates a suitable direction according to the states of the connected equipment and the connected power source at that time, the charging rate of the secondary battery, and the like, so as to be in the charge direction when charge is required and to be in the discharge direction when discharge can be performed, the operation switching of the bidirectional regulator based on the detection of the change becomes proper switching according to the various situations.

Preferably, the charge and discharge detecting circuit may include one or a plurality of field-effect transistors (FET1 and FET2 in FIGS. 2 and 5) serially connected on a current pathway on which a charge current and a discharge current of the secondary battery flow, a section (B1 and B2 in FIG. 2, or 11 and 15 in FIG. 5) for applying bias voltages to gate terminals so that both end voltages of the field-effect transistors become predetermined voltages, and a comparison circuit (Comp1 and Comp2 in FIG. 2 or 21 in FIG. 5) for mutually comparing both the end voltages of the field-effect transistors.

By such a configuration, the charge and discharge detecting circuit has a small resistance when a lot of current flows at the time of charge or discharge to realize a low loss, and even if the current becomes small at the time of switching of a current direction, the change of the direction can be surely detected.

Further preferably, the bidirectional regulator may include a plurality of field-effect transistors (FET1 and FET2 in FIG. 5) serially connected on a current pathway of a charge current and a discharge current of the secondary battery to perform output adjustment, and the charge and discharge detecting circuit may mutually compare both end voltages of the plurality of field-effect transistors of the bidirectional regulator to detect a direction of a current.

By such a configuration, it is possible to attain the reduction of the cost thereof by making parts serve a double purpose and the reduction of the loss thereof. Moreover, when the field-effect transistors are turned on at the time of a normal operation of the bidirectional regulator, it is possible to make the field-effect transistors be in the same state as being given a gate bias for detecting the aforesaid current direction, and consequently it is also possible to surely detect a change of the current direction based on the both end voltages of the transistors at that time.

Further preferably, the charge and discharge circuit may further comprises a power source voltage detection circuit (40 in FIG. 7) for detecting the power source voltage to enable the charge of the secondary battery by inputting the power source voltage only when the power source voltage is lower than a full charge voltage of the secondary battery.

To put it concretely, the charge and discharge circuit may further comprises a first switch element (FET5 in FIG. 8) capable of intercepting input of the power source voltage; and a section for intercepting the input of the power source voltage by turning off the first switch element when the power source voltage is higher than the full charge voltage of the secondary battery.

Moreover, to put it concretely, the bidirectional regulator may be configured to be able to perform a voltage raising operation, and the bidirectional regulator may start the voltage raising operation to supply the charge current to the secondary battery when a charge voltage becomes in a neighborhood of the power source voltage at the time of charging the secondary battery.

By such a configuration, even if the secondary battery becomes in the situation in which the power source voltage is directly applied to the secondary battery owing to element breakage or the like, no overcharge occurs in the second battery because the power source voltage is equal to or less than the full charge voltage, and high safety can be secured. Moreover, it is also possible to make the secondary battery be in full charge by the voltage raising operation at the time of charge even if the power source voltage is equal to or less that the full charge voltage.

Further preferably, the bidirectional regulator (10 in FIG. 10) may be configured to be able to perform a voltage lowering operation by switching control for adjusting an output by making the transistors perform switching operations, and by linear control for adjusting the output by continuously changing on-resistances of the transistors, and the charge and discharge circuit may be provided with a control section (51) for switching a control system at the time of the voltage lowering operation of the bidirectional regulator to the switching control or the linear control based on the power source voltage and/or a battery voltage.

By such a configuration, the loss at the time of charge can be reduced and the improvement of charge efficiency can be attained by performing the linear control during a period in which the charge voltage is lower than the power source voltage in a small measure.

Further preferably, when the battery voltage becomes in a neighborhood of a lowest operation voltage of the external device during discharge from the secondary battery to the external device, the bidirectional regulator may start the voltage raising operation to perform power supply to the external device.

Moreover, both of a threshold value of the battery voltage at which the voltage raising operation at the time of the discharge of the bidirectional regulator is started and a threshold value of the battery voltage at which the voltage raising operation is stopped may severally have a hysteresis (V13-V12, in FIG. 14).

By such a configuration, even if no power source voltage is input, it is possible to continue to drive the external device for a long time by fully using the electric power of the secondary battery. Moreover, by the aforesaid hysteresis, it becomes possible to avoid the situation in which a start state and a stop state of a voltage raising operation flutter and the operation becomes unstable state at the time of the switching of voltage raising operation.

Further preferably, the charge and discharge circuit may further comprises an abnormality detection circuit (71 in FIG. 15) for detecting overcharge and/or overdischarge of the secondary battery, and a control circuit (72) for intercepting an input and/or the output of the bidirectional regulator based on the detection of the abnormality detection circuit.

Moreover, preferably, the charge and discharge circuit may further comprises a second switch element (FET6 in FIG. 16) capable of intercepting the output to the external device, an output voltage detection circuit (81) for detecting an output voltage, and a control circuit (82) for turning off the second switch element when the output voltage exceeds a reference value.

Moreover, preferably, the charge and discharge circuit may further comprises a fuse (93 in FIG. 17) provided on the current pathway to connect the power source voltage and the secondary battery, a voltage and current detection circuit (92) for detecting the power source voltage and an input current, and a third switch element (FET3) serially connected to the fuse, wherein when the power source voltage or the input current exceeds a limiting value, the third switch element may be turned on to cut the fuse.

By such protection method, the secondary battery and the external device can be protected at the time of various abnormalities.

Moreover, in order to attain the object mentioned above, the present invention is a battery pack incorporating a secondary battery therein, wherein the aforesaid charge and discharge circuit of the secondary battery is set up in a package to be integrated with the secondary battery. By such a configuration, it becomes possible to easily apply the secondary battery to various convenient uses.

Incidentally, the signs indicating the correspondence relations with the embodiments are listed in parentheses in the description of this item, but the present invention is not limited to the listed components.

Effects of the Invention

As described above, according to the present invention, the proper switching between a charge operation and a discharge operation of the secondary battery can be voluntarily performed by the charge and discharge circuit according to various situations, and thereby the advantage of being possible to easily apply the secondary battery to various convenient uses.

BRIEF DESCRIPTION OF THE DRAWINGS

FIG. 1 is a block diagram showing the outline of a charge and discharge system of a secondary battery of a first embodiment of the present invention;

FIG. 2 is a configuration diagram showing the part of a charge and discharge detecting circuit of FIG. 1 concretely;

Figure 3A:
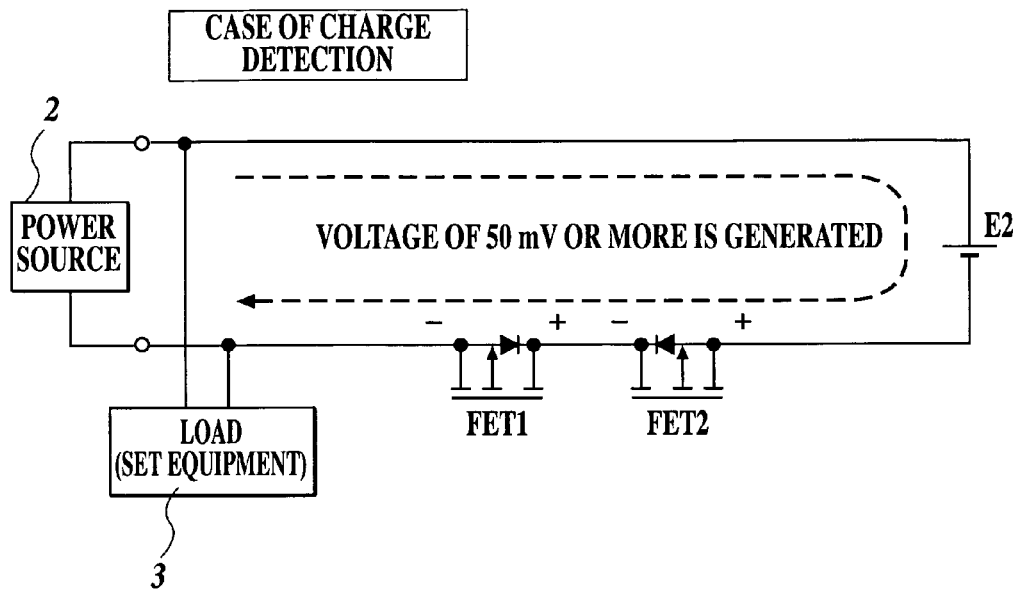
FIG. 3A is an explanatory diagram showing the state of the case of charge detection in the charge and discharge detecting circuit of FIG. 2.

EXPLANATION OF REFERENCE NUMERAL 2 power source device
3 set equipment
E2 secondary battery
10 bidirectional regulator circuit
11 first SW control circuit
15 second SW control circuit
20 charge and discharge detecting circuit
21 detection circuit
30 switching control circuit
FET1-FET4 transistors
B1, B2 bias circuits
Comp1, Comp2 comparators
40 power source voltage detection circuit (for input interception control of a high voltage)
41 switch circuit
50 power source voltage detection circuit (for switching control to a linear operation)
53 battery voltage detection circuit (for switching control to the linear operation)
61 battery voltage detection circuit (for switching control to voltage raising output)
71 voltage and current detection circuit (for detection of overcharge and overdischarge)
72 protection operation control circuit
81 voltage detection circuit (for detection of excessive voltage output)
FET6 switch element
82 switch control circuit
92 voltage and current detection circuit (for detection of abnormal input)
93 fuse
94 protection operation control circuit
100 battery pack

THE BEST MODE FOR CARRYING OUT THE INVENTION

In the following, the embodiments of the present invention will be described with reference to the attached drawings.

First Embodiment

FIG. 1 is a block diagram showing the outline of a charge and discharge system of a secondary battery of a first embodiment of the present invention, and FIG. 2 is a circuit configuration diagram concretely showing the part of a charge and discharge detecting circuit in the charge and discharge system.

The charge and discharge system of the first embodiment sometimes performs the charge of a secondary battery E2 by inputting a power source voltage from a power source device 2, such as an AC adapter, and sometimes supplies electric power from a secondary battery E2 to set equipment 3, such as a portable telephone or a digital camera. A charge and discharge circuit is composed of the parts of the charge and discharge system except for the power source device 2, the set equipment 3, and the secondary battery E2.

The charge and discharge system includes the power source device 2, such as the AC adapter, the secondary batter E2, such as a lithium ion battery or a nickel hydrogen battery, a bidirectional regulator circuit 10 to input power source voltage therein and to output a charge current to the secondary battery E2 sometimes and to output a voltage to the set equipment 3 based on the battery voltage of the secondary battery E2 sometimes, a charge and discharge detecting circuit 20 for detecting the direction of a current of the secondary battery E2, that is, a charge direction or a discharge direction, a switching control circuit 30 for switching the operation of the bidirectional regulator circuit 10 to either a charge operation or a discharge operation based on the output of the charge and discharge detecting circuit 20, and the like.

The bidirectional regulator circuit 10 performs the output adjustment of a constant current output, a raised voltage output, a lowered voltage output, and the like, by the switching control of transistors or the control of the on-resistances of transistors. Moreover, the bidirectional regulator circuit 10 is made to be able to execute a charge operation to adjust an output on the side of the secondary battery E2 while the side of the power source device 2 is set as an input, and a discharge operation to adjust an output on the side of the set equipment 3 while the side of the secondary battery E2 is set as an input, by switching both the operations in accordance with the control of the switching control circuit 30.

The charge and discharge detecting circuit 20 includes, for example, two transistors FET1 and FET2 serially connected between the secondary battery E2 and a power source terminal t0, bias circuits B1 and B2 to give gate biases to generate low and almost constant voltages at both ends of the transistors FET1 and FET2, two comparators Comp1 and Comp2 to perform the output of signals indicating the direction of the current by comparing the voltages at both the ends of the two transistors FET1 and FET2, and the like, as shown in FIG. 2.

The two transistors FET1 and FET2 are, for example, P-channel metal oxide semiconductor (MOS) FETs, and are connected with each other so that their body diodes may be arranged oppositely to each other. Thereby, a current flows through the channel between the source and drain of either of the transistors FET1 and FET2, and a controlled voltage is output between the source and the drain.

The bias circuits B1 and B2 severally avoid increasing the loss of the current flowing through the transistors FET1 and FET2 by making the resistances between their sources and drains small when the current is large, and severally raise the voltages between their sources and drains up to the level capable of being detected by making the resistances between the sources and drains large when the current is small. The voltages generated between their sources and drains may be ones that can be detected and are low, such as ones from 20 mV to 50 mV. The values of the voltages need not be necessarily strictly constant voltages, and may be roughly the aforesaid voltages. Accordingly, each of the bias circuits B1 and B2 can be composed of, for example, a Zener diode, the anode and cathode of which are connected to the drain terminal and gate terminal, respectively, of the corresponding transistor between the transistors FET1 and FET2.

Next, the operation of the charge and discharge system configured as mentioned above will be described.

Figure 3B:
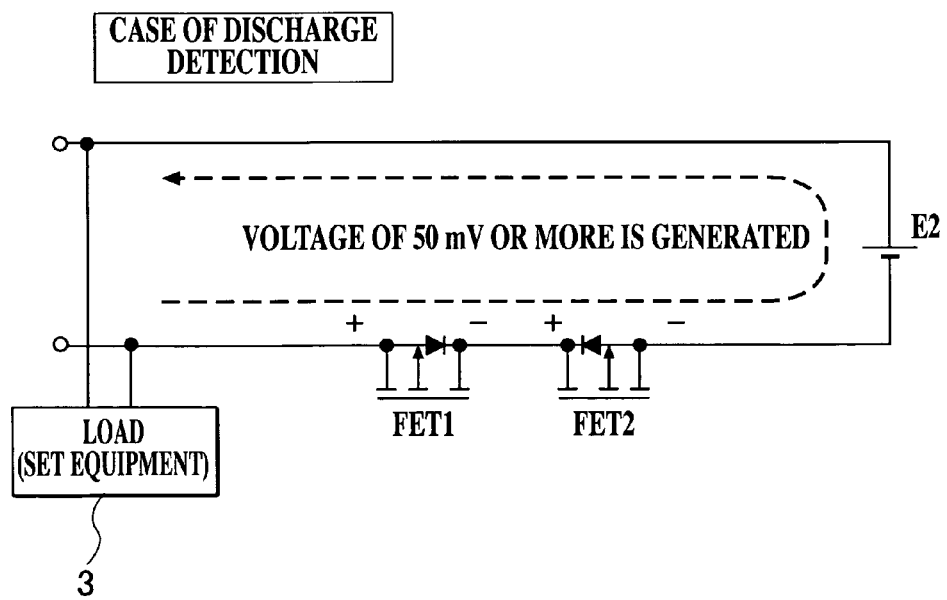
FIG. 3B is an explanatory diagram showing the state of the case of discharge detection in the charge and discharge detecting circuit of FIG. 2.

FIGS. 3A and 3B shows diagrams illustrating the states of the charge and discharge detecting circuit 20 in each of the cases of charge detection and discharge detection.

For example, if the power source device 2 having a large output capacity is connected to the charge and discharge detecting circuit 20 in the state in which the bidirectional regulator circuit 10 has performed a discharge operation and the charging rate of the secondary battery E2 is lowered, then a current flows backward in the bidirectional regulator circuit 10, and a current in the charge direction sometimes flows in a small measure.

In such a case, as shown in FIG. 3A, a detectable low voltage (for example, 30 mV to 100 mV or more) is generated at the end on the side of the secondary battery E2 between both ends of the transistors FET1 and FET2 by the minute current in the charge direction, and the generated low voltage is detected by the comparator Comp1. Thus a charge detection signal is output from the comparator Comp1.

When the charge detection signal is output, the switching control circuit 30 switches the operation state of the bidirectional regulator circuit 10 from the discharge operation to a charge operation, and consequently the charge and discharge system shifts its state to its charge state.

Moreover, for example, also if the charging rate of the secondary battery E2 lowers and a discharge operation of the bidirectional regulator circuit 10 cannot be continued in the state in which the bidirectional regulator circuit 10 performs the discharge operation to supply electric power from the secondary battery E2 to the set equipment 3 in the state in which the power source device 2 is connected, then the current of the bidirectional regulator circuit 10 flows backward by the voltage from the power source device 2, and a current in the charge direction sometimes flows in a small measure.

Also in such a case, as described above, the current in the charge direction is detected, and the switching from the discharge operation to a charge operation is performed.

On the other hand, if the power source device 2 is taken off in the state in which the bidirectional regulator circuit 10 is performing the charge operation to charge the secondary battery E2, then the bidirectional regulator circuit 10 becomes impossible to continue the charge operation, and a current in the discharge direction flows in a small measure.

Thereupon, as shown in FIG. 3B, a detectable low voltage (for example, 30 mV to 100 mV or more) is generated at the end on the side of the load 3 between both the ends of the transistors FET1 and FET2 by the minute current in the discharge direction, and the generated low voltage is detected by the comparator Comp2. Thus, a discharge detection signal is output from the comparator Comp2.

When the discharge detection signal is output, the switching control circuit 30 switches the operation state of the bidirectional regulator circuit 10 from the charge operation to the discharge operation, and consequently the charge and discharge system is shifted to the discharge state.

Figure 4:
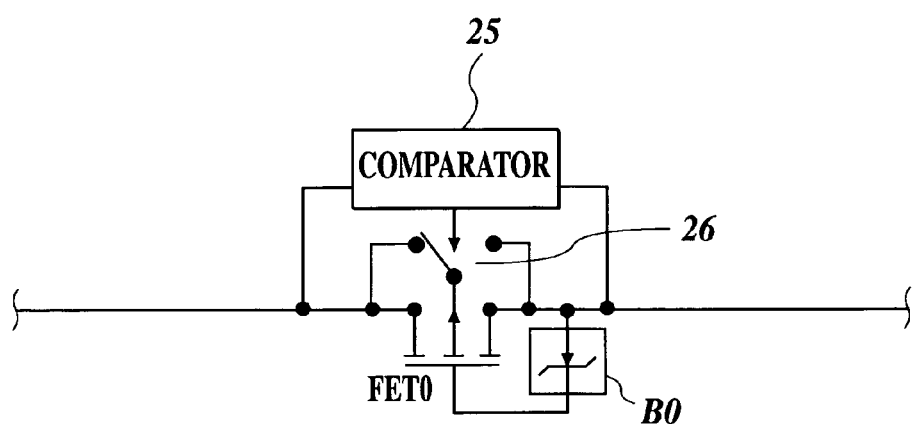
FIG. 4 is a diagram showing a circuit example of a current voltage conversion element composed of one transistor in the charge and discharge detecting circuit of FIG. 1.

FIG. 4 shows a circuit example of the case where the elements for current voltage conversion in the charge and discharge detecting circuit 20 are composed of a transistor.

Although the two transistors FET1 and FET2 are configured by being connected with each other in the state in which the body diodes are arranged to be opposite to each other as the elements to convert a current to a voltage in the charge and discharge detecting circuit 20 of FIG. 2, it is also possible to configure the conversion element with one transistor FET0 as shown in FIG. 4. The circuit example is provided with a switch 26 for switching the back gate of the transistor FET0 between both the terminals of the source thereof and the drain thereof according to the direction of a current, and a comparator 25 for switching the connection of the switch 26 based on the both end voltages of the transistor FET0. Also in such a configuration, it is possible to control the discharge current and the charge current not to flow only through the body diode by using one transistor FET0, and it becomes possible to detect a change of the direction of a current even if the current is a minute current.

As described above, according to the charge and discharge system of the first embodiment, proper switching between a charge operation and a discharge operation can be made by the charge and discharge system voluntarily, and consequently the secondary battery E2 can be easily applied to various highly convenient uses. For example, a piece of set equipment driven by an AC adapter can be temporarily made to be a piece of wireless equipment by using the secondary battery E2 only by connecting the present charge and discharge system to the power source terminal of the set equipment in parallel. Moreover, for example, by connecting a fully charged secondary battery to another empty secondary battery through the charge and discharge circuit 20, a charge current is made to flow from one secondary battery to the other secondary battery, and the distribution of charges can be attained. Moreover, the charge and discharge system can be easily applied to various uses, such as the case of compensating electric power by supplying power from the secondary battery E2 voluntarily when the electric power is temporarily insufficient by the normal rated power of the power source device 2.

Second Embodiment

Figure 5:
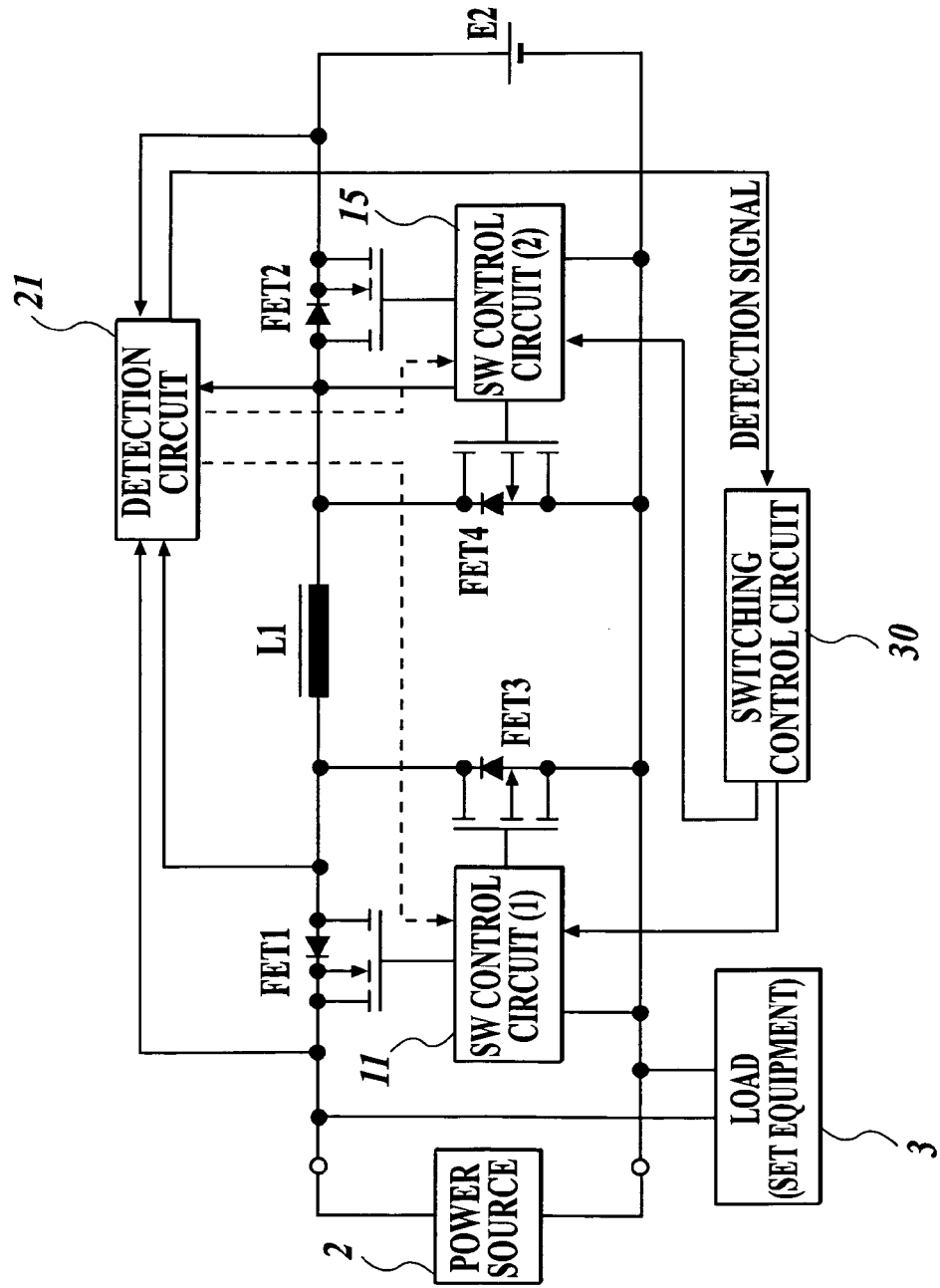
FIG. 5 is a circuit configuration diagram of a charge and discharge system of a second embodiment.
Figure 6:
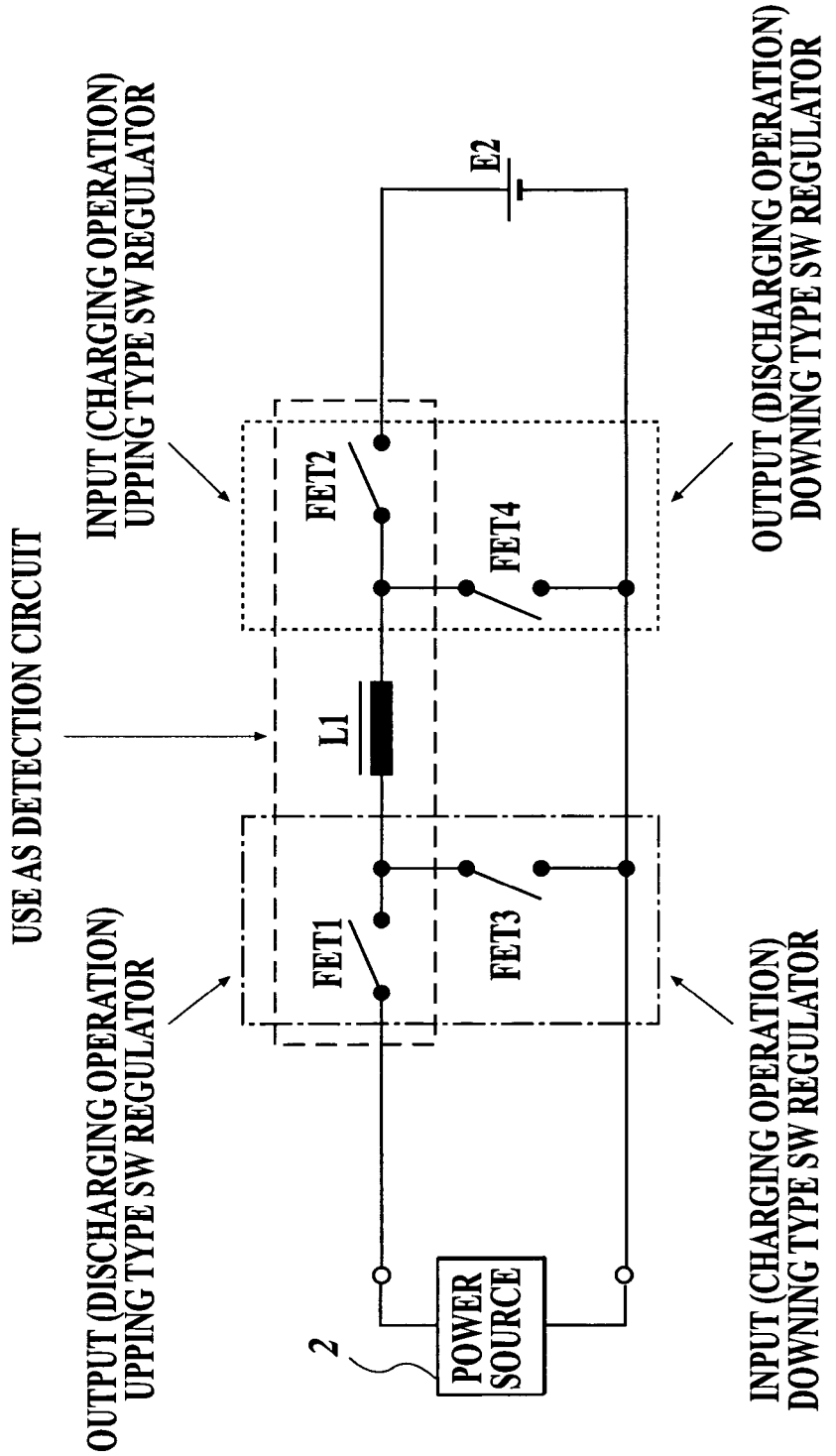
FIG. 6 is a diagram for illustrating each function of the bidirectional regulator circuit of FIG. 5.

FIG. 5 shows a configuration diagram of a charge and discharge system of a second embodiment, and FIG. 6 shows an explanatory diagram of the operation method of the bidirectional regulator circuit of the charge and discharge system.

The charge and discharge system of the second embodiment uses the transistors FET1 and FET2 of the charge and discharge detecting circuit also as the transistors FET1 and FET2 of the bidirectional regulator circuit, and the other components are almost similar to those of the first embodiment.

The bidirectional regulator circuit of the embodiment includes the first transistor FET1, a reactor L1, and the second transistor FET2, which are serially connected between the power source device 2 and the secondary battery E2 in order; a third transistor FET3, which is connected between one terminal of the reactor L1 and the ground; a fourth transistor FET4, which is connected between the other terminal of the reactor L1 and the ground; a first SW control circuit 11 to perform the drive control of the first and third transistors FET1 and FET3; a second SW control circuit 15 to perform the drive control of the second and fourth transistors FET2 and FET4, and the like.

P-channel MOS FETs, N-channel MOS FETs, and the like, can be applied as the first to fourth transistors FET1-FET4, as shown in FIG. 5.

The bidirectional regulator circuit can perform a voltage lowering operation at the time of charge and a voltage raising operation at the time of discharge by the switching control of the first and third transistors FET1 and FET3, as shown in FIG. 6. Moreover, the bidirectional regulator circuit can perform the voltage lowering operation at the time of discharge and the voltage raising operation at the time of charge by the switching control of the second and fourth transistors FET2 and FET4.

Various methods including switching control, such as a pulse width modulation method and a frequency modulation method, linear control to change the on-resistance of a transistor continuously like a series regulator and a shunt regulator, and the like, can be applied as the control system of the transistors FET1-FET4.

Incidentally, a detection voltage indicating the voltage or current of the secondary battery E2 and a detection voltage indicating the output voltage to the set equipment 3 are input into the first and second SW control circuits 11 and 15, although they are not shown, and the charge and discharge detecting circuit is adapted to adjust the charge current or the charge voltage to the secondary battery E2, or to adjust the output voltage to the set equipment 3 based on those detection voltages.

The charge and discharge detecting circuit of the present embodiment uses the first and second transistors FET1 and FET2 of the bidirectional regulator circuit as the elements for converting a current into a voltage. Then, the charge and discharge detecting circuit inputs each of the both end voltages of the first and second transistors FET1 and FET2 into a detection circuit 21 to monitor the direction of a current.

Incidentally, in the circuit configuration of the present embodiment, the reactor L1 to generate an electromotive force is provided between the first and second transistors FET1 and FET2, and accordingly the circuit is configured so that four voltages are input into the detection circuit 21 from both the ends of each of the two transistors FET1 and FET2 to detect the direction of a current. If the bidirectional regulator circuit is the one in which the connection position of the reactor L1 is different, then the two input at the center side may be omitted, and the direction of a current may be monitored by inputting only the two voltages of both the ends of the transistors FET1 and FET2 into the detection circuit 21.

Moreover, in the present embodiment, in order that a low voltage enabling the detection of the direction of a current may be always generated in the first and the second transistors FET1 and FET2, the first and second SW control circuits 11 and 15 may be configured to drive the first and second transistors FET1 and FET2, respectively, so that the on-resistances of the first and second transistors FET1 and FET2 may be slightly high if the current is small at the time of the on-operations of the first and second transistors FET1 and FET2.

Alternatively, the monitoring of a current direction by the detection circuit 21 may be configured to be intermittently performed in a predetermined period, and the charge and discharge system may be configured so that notice signals are output from the detection circuit 21 to the SW control circuits 11 and 15 as shown by dotted lines in FIG. 5 at the timing of performing the detection of the current direction, and that the SW control circuits 11 and 15 apply a gate bias to each of the transistors FET1 and FET2 so that the transistors FET1 and FET2 severally operate at a low constant voltage when the notice signals are input into them.

By adopting the configuration as mentioned above, the transistors FET1 and FET2 of the bidirectional regulator circuit are applied as the current voltage conversion elements of the charge and discharge detecting circuit, and consequently similar operation as that of the first embodiment can be obtained.

Third Embodiment

Figure 7:
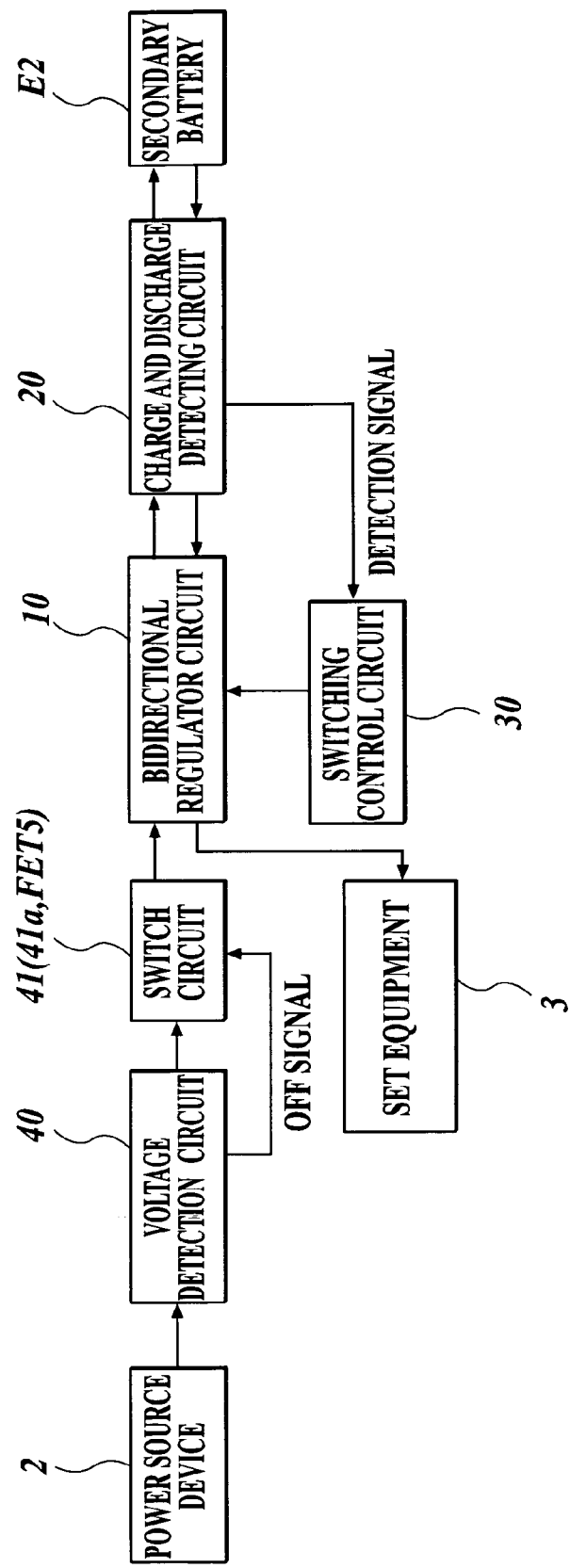
FIG. 7 is a block diagram showing the schematic configuration of a charge and discharge system of a third embodiment.
Figure 8:
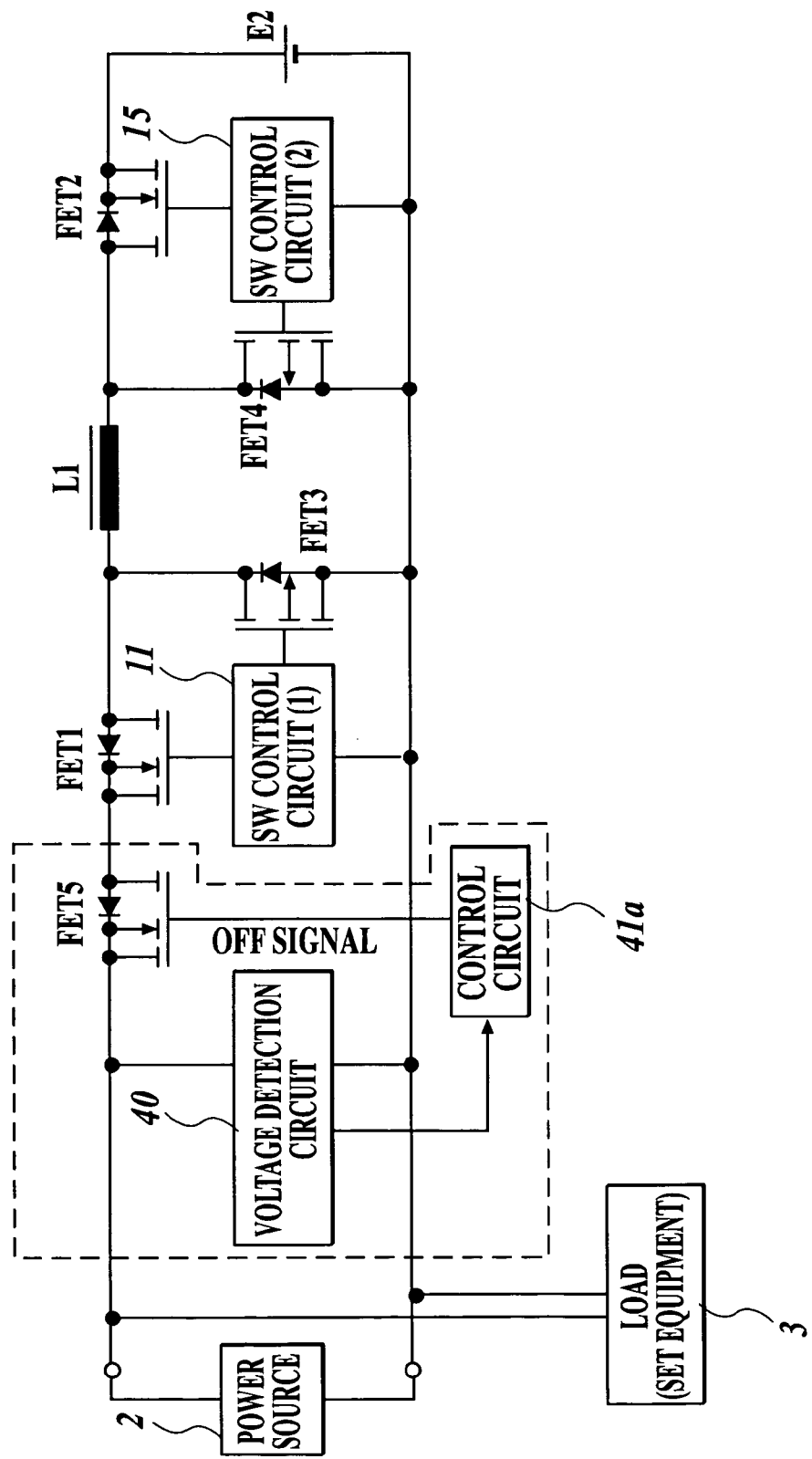
FIG. 8 is a circuit configuration diagram of the charge and discharge system of FIG. 7.

FIG. 7 is a block diagram showing the schematic configuration of a charge and discharge system of a third embodiment, and FIG. 8 is a circuit configuration diagram of the charge and discharge system. Incidentally, FIG. 8 omits the illustration of the configurations of the charge and discharge detecting circuit 20 and the switching control circuit 30.

In addition to the configuration of the second embodiment, the charge and discharge system of the third embodiment includes the configuration of limiting the input power source voltages to the full charge voltage of the secondary battery E2 or less.

That is, the charge and discharge system of the present embodiment is provided with a power source voltage detection circuit 40 for detecting the power source voltage and a switch circuit 41 for intercepting the input of the power source voltage that is higher than a reference voltage, between the power source terminal to which the power source device 2 is connected and the bidirectional regulator circuit 10.

The power source voltage detection circuit 40 can be composed of, for example, a resistance dividing circuit.

The switch circuit 41 is composed of a switch transistor FET5, which is serially connected between the power source terminal and the bidirectional regulator circuit 10, and a control circuit 41*a* to perform the on-off control of the MOS transistor FET5 by comparing a detection voltage of the source voltage detection circuit 40 and a reference voltage, as shown in FIG. 8.

The reference voltage, based on which the switch circuit 41 is turned off, may be set to the full charge voltage (for example, 4.2 V) of the secondary battery E2 or a voltage (for example, 3.8 V to 4.2 V) that is slightly lower than the full charge voltage.

Since the power source voltage is the full charge voltage or less, the bidirectional regulator circuit 10 is configured to charge the secondary battery E2 up to the full charge thereof by performing the output control including a voltage raising operation when the charge voltage of the secondary battery E2 becomes the power source voltage or more.

According to the charge and discharge system of the present embodiment, since the input of the power source voltage can be limited to the full charge voltage of the secondary battery E2 or less, the overcharge of the secondary battery E2 can be prevented and the high safety thereof can be secured even if a situation of the direct application of the power source voltage to the secondary battery E2 is caused owing to a circuit trouble or the like.

Figure 9:
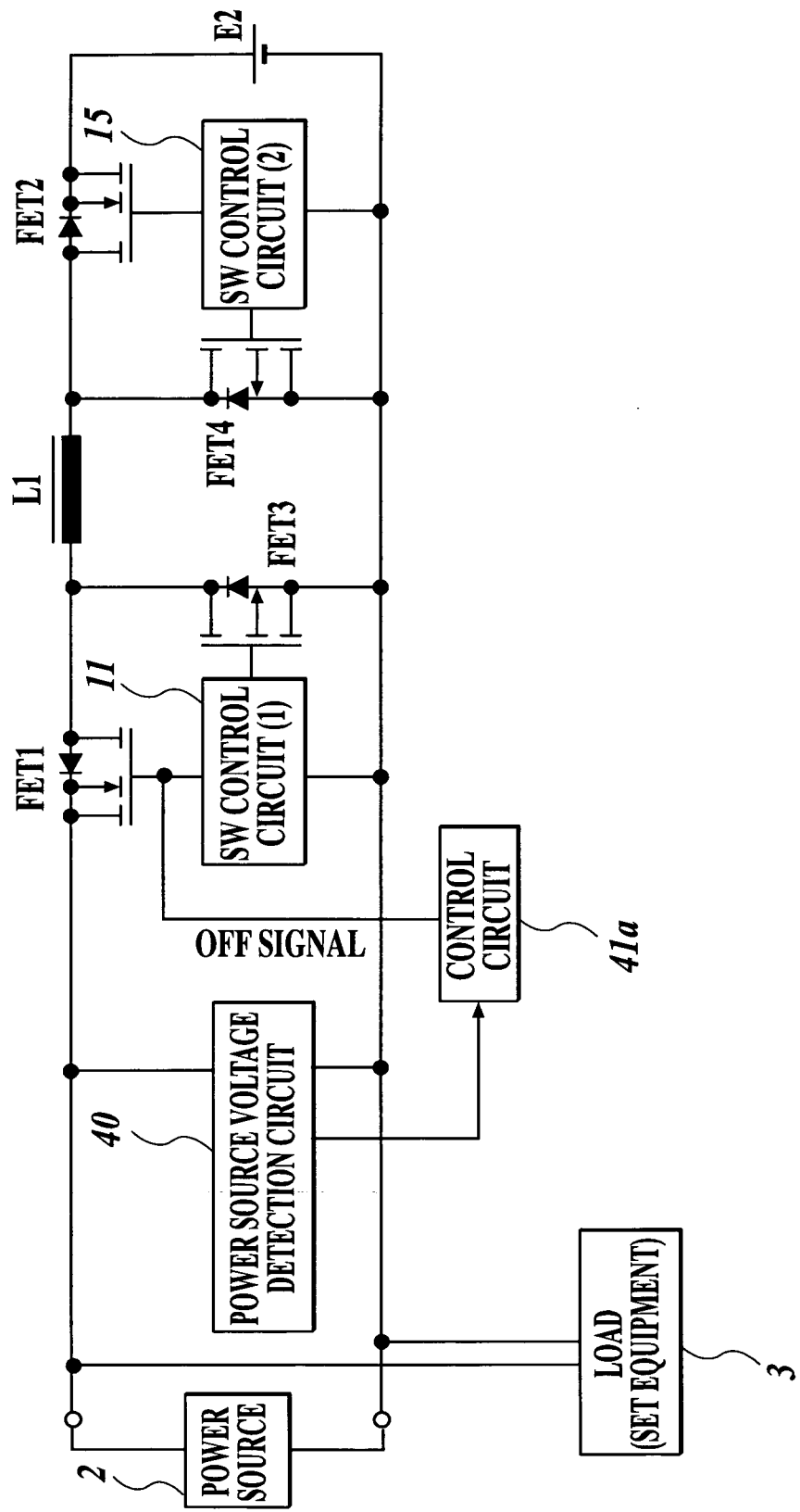
FIG. 9 is a circuit configuration diagram showing a modification of the charge and discharge system of the third embodiment.

FIG. 9 shows a modification of the charge and discharge system of the third embodiment.

Incidentally, as shown in FIG. 9, the first transistor FET1 of the bidirectional regulator circuit may be applied as the switch element for intercepting the input of the power source voltage.

Fourth Embodiment

Figure 10:
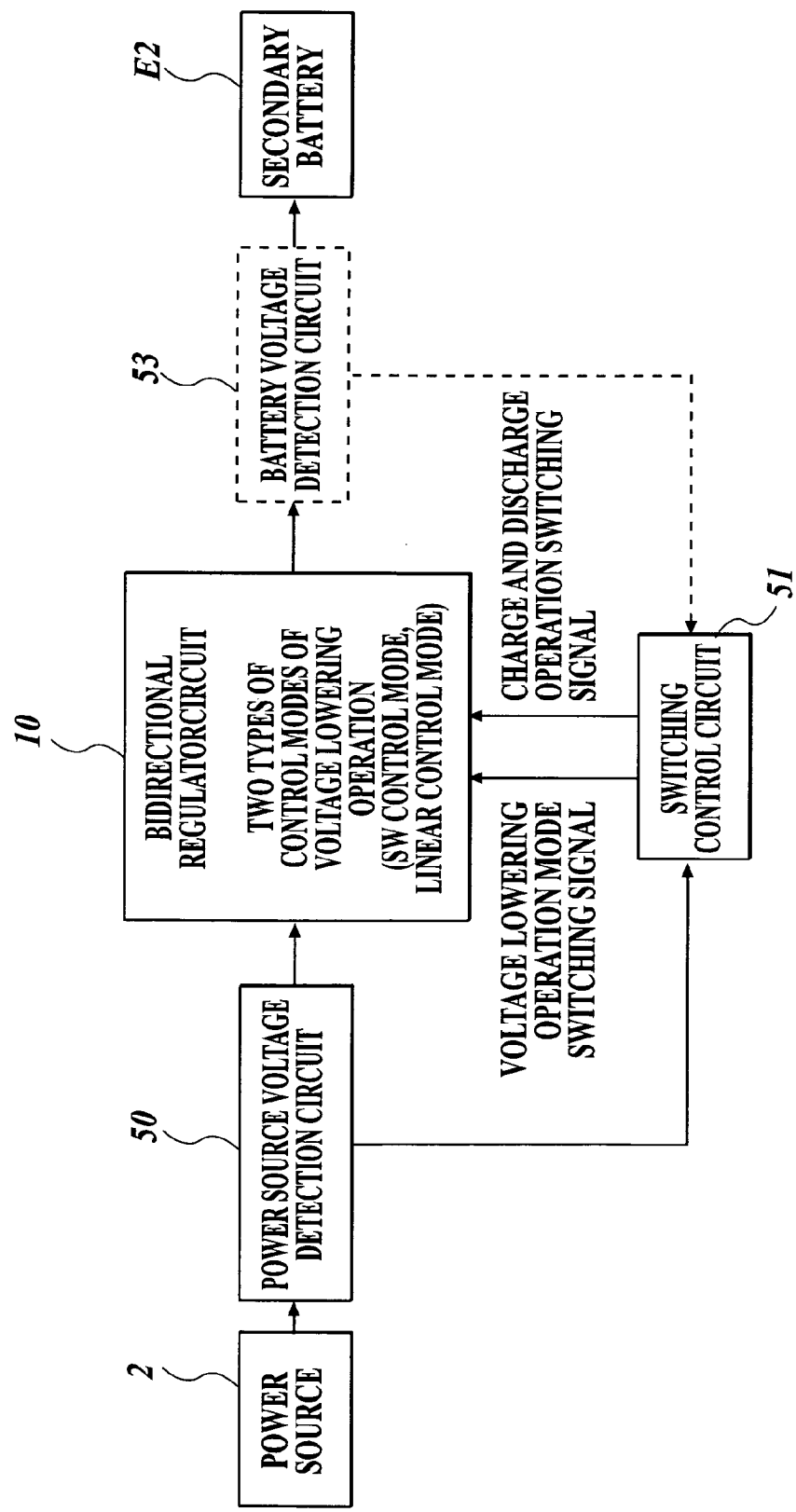
FIG. 10 is a block diagram showing the schematic configuration of a charge and discharge system of a fourth embodiment.
Figure 11:
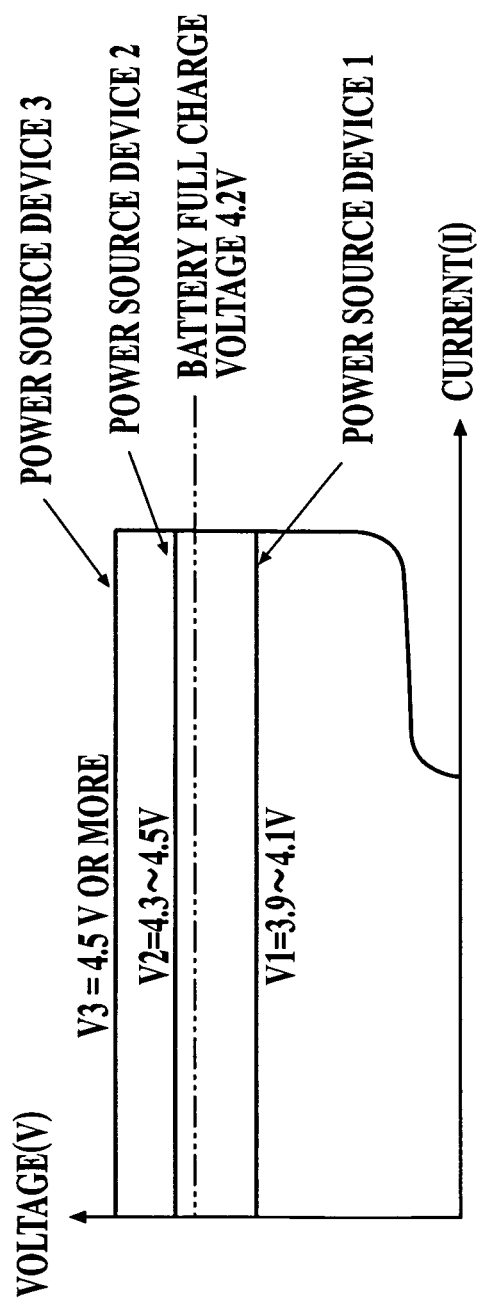
FIG. 11 is a characteristic graph showing output characteristics of three kinds of power source devices supposed to be connected to the charge and discharge system.

FIG. 10 is a block diagram showing the schematic configuration of a charge and discharge system of a fourth embodiment, and FIG. 11 is a characteristic graph showing the output characteristics of three types of power source devices supposed as the connected power source devices.

In addition to the configuration of the charge and discharge system of the second embodiment, the fourth embodiment includes the function of suitably switching the operation mode of the bidirectional regulator circuit 10 at the time of charge between the switching control mode and the linear control mode according to the power source voltage and the charge voltage. Incidentally, in the present embodiment, the illustration and description of the charge and discharge detecting circuit and the operation and configuration thereof are omitted, the charge and discharge detecting circuit is also equipped in the present embodiment similarly to the second embodiment.

In order to realize the function mentioned above, the charge and discharge system of the present embodiment is equipped with a power source voltage detection circuit 50 for detecting the voltage at the input stage of the power source voltage. Then, the charge and discharge system is configured to input the detection voltage into a switching control circuit 51 for switching the operation mode of the bidirectional regulator circuit 10 at the time of voltage lowering charge by the switching control circuit 51.

In the charge and discharge system of the present embodiment, as shown in FIG. 11, it is supposed that a plurality of magnitudes of power source voltages, such as a voltage V1 that is lower than the full charge voltage of the secondary battery E2, a voltage V2 that is slightly higher than the full charge voltage, and a voltage V3 that is far higher than the full charge voltage, are input as the input power source voltages.

The bidirectional regulator circuit 10 is configured to be able to perform the switching control mode to adjust a charge voltage by switching the transistors, and the linear control mode to adjust the charge voltage by continuously changing the on-resistances of the transistors like a series regulator, at the time of a voltage lowering operation at the time of charge.

Figure 12:
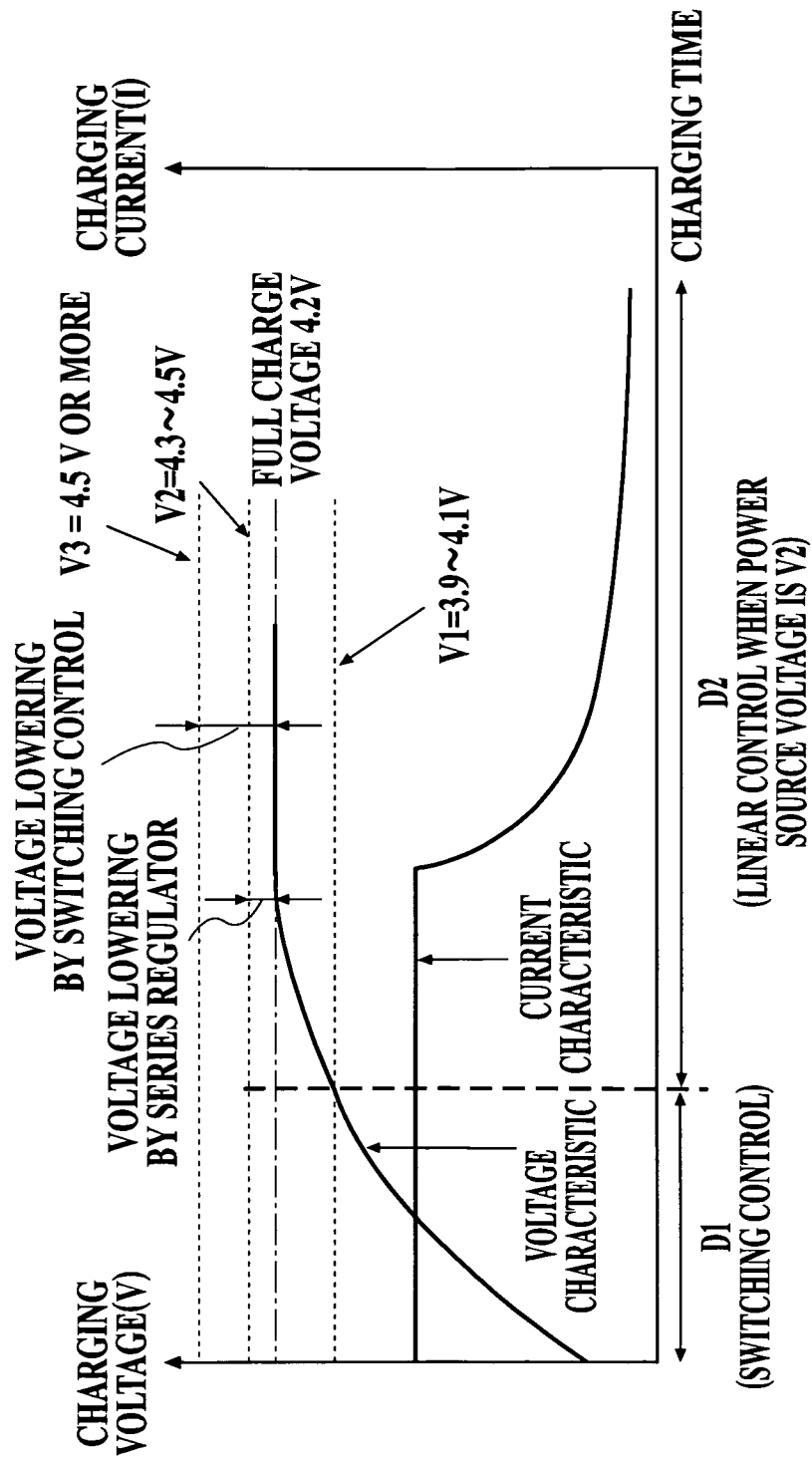
FIG. 12 is a characteristic graph for illustrating the operation of the charge and discharge system of FIG. 10 at the time of charge.

FIG. 12 shows a characteristic graph for illustrating the operation of the charge and discharge system at the time of charge.

Because the voltage difference between the power source voltage and the charge voltage is large in a period D1 in which the charging rate is low and the charge voltage is low in the charge and discharge system of the present embodiment, the bidirectional regulator circuit 10 performs charge of the secondary battery E2 by performing a switching operation irrespective of the magnitude of the power source voltage.

On the other hand, because the difference between the power source voltage and the charge voltage becomes small at some power source voltages in a period D2 in which the charging rate becomes higher from a medium degree, the charge and discharge system is configured to switch the operation mode of the bidirectional regulator circuit 10 according to the magnitude of the power source voltage. That is, if the power source voltage is the voltage V2, which is somewhat higher than the full charge voltage, then the operation of the bidirectional regulator circuit 10 is switched to the linear control mode, and the power source voltage is lowered by, for example, the operation of the series regulator or the like to perform the charge of the secondary battery E2.

On the other hand, if the power source voltage is the voltage V1, which is lower than the full charge voltage, then a voltage raising operation is needed. Accordingly, the charge and discharge system does not become the linear control mode, but performs the charge of the secondary battery E2 in the switching control mode. Furthermore, if the power source voltage is the voltage V3, which is far higher than the full charge voltage, then the difference voltage between the power source voltage and the charge voltage does not become small. Accordingly, the operation of the bidirectional regulator circuit 10 is not switched to the linear control mode, but remains in the switching control mode to perform the charge of the secondary battery E2.

As described above, if the power source voltage is higher than the charge voltage in a small measure, then the bidirectional regulator circuit 10 is switched to be in the linear control mode. Thereby, the loss in the bidirectional regulator circuit 10 can be made to be smaller than that in the case of leaving the bidirectional regulator circuit 10 in the switching control mode, and consequently the improvement of the charge efficiency can be attained.

Incidentally, as shown by a dotted line in FIG. 10, the charge and discharge system may be configured as follows: a battery voltage detection circuit 53 for detecting a charge voltage at the preceding stage of the secondary battery E2; the detected voltage by the battery voltage detection circuit 53 is input into the switching control circuit 51; the switching control circuit 51 compares the power source voltage with the charge voltage; the control of the bidirectional regulator circuit 10 is switched from the switching control mode to the linear control mode in a period during which the power source voltage is larger than the charge voltage in a small measure (for example, +0.1 V to 0.4 V); and the power source voltage is lowered by the operation of the series regulator to perform the charge of the secondary battery E2. Also by such control, the improvement of the efficiency at the time of charge can be attained.

Fifth Embodiment

Figure 13:
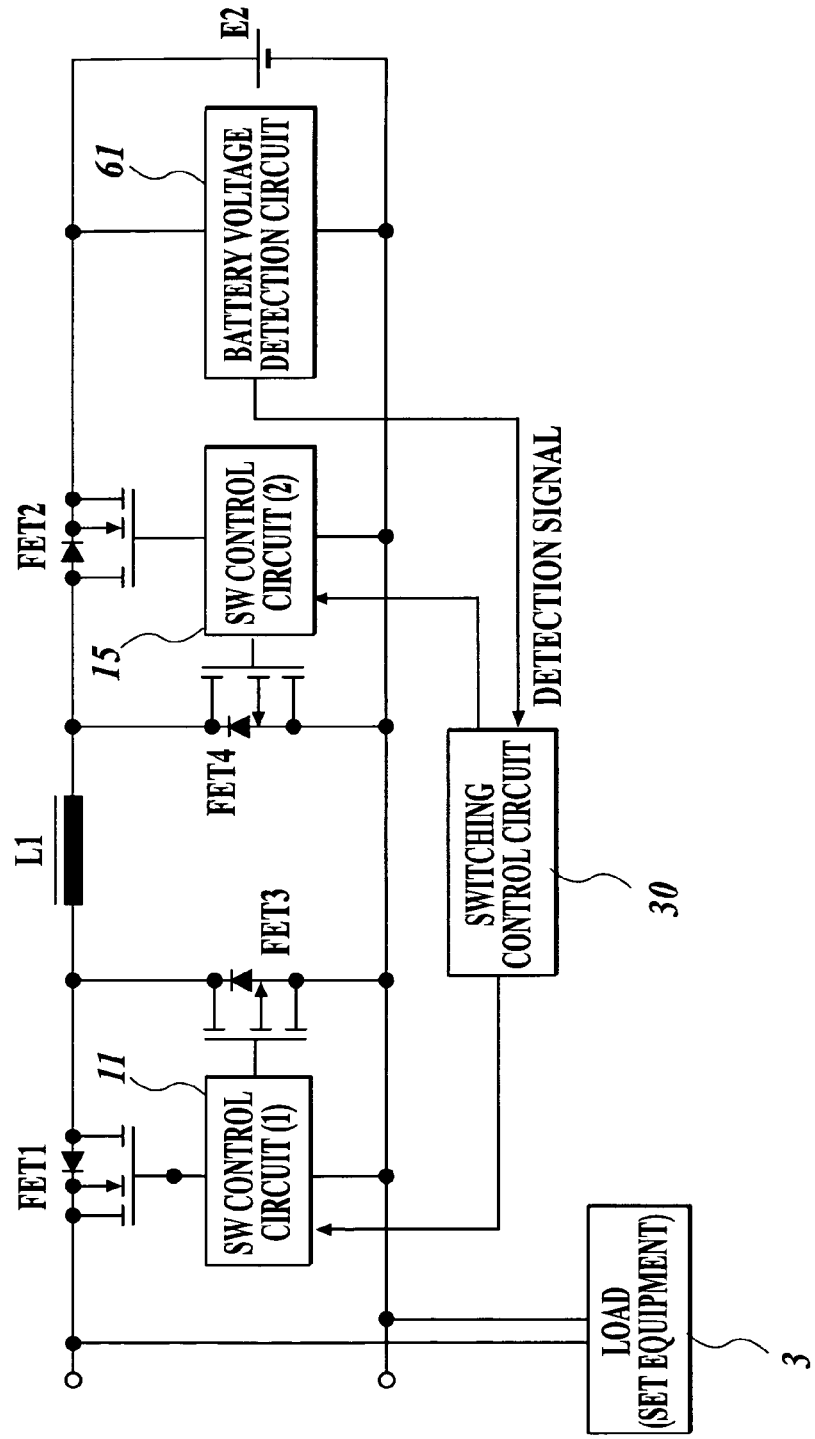
FIG. 13 is a circuit configuration diagram showing a charge and discharge system of a fifth embodiment.
Figure 14:
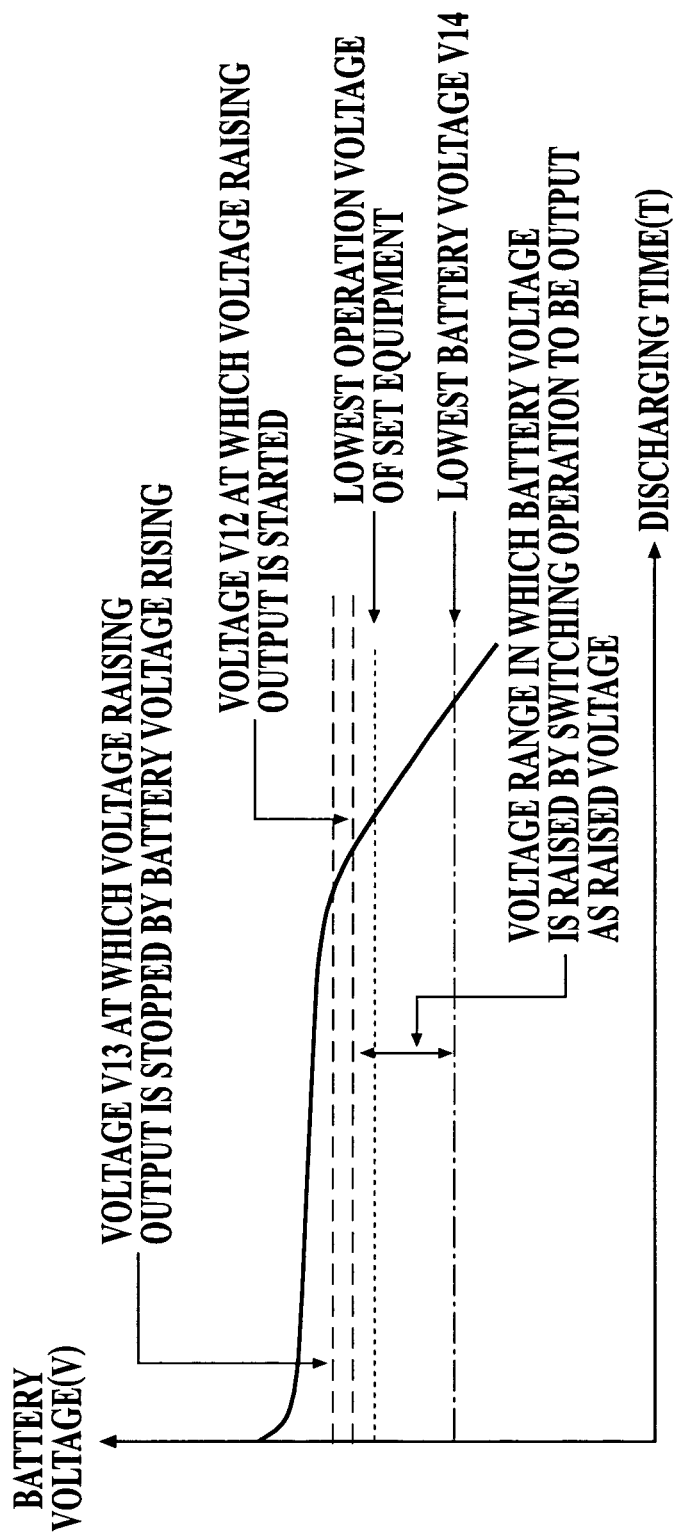
FIG. 14 is a characteristic graph for illustrating the operation of the charge and discharge system of FIG. 13 at the time of discharge.

FIG. 13 shows a circuit configuration diagram of a charge and discharge system of a fifth embodiment, and FIG. 14 shows a characteristic graph for illustrating the operation of the charge and discharge system at the time of discharge.

In addition to the configuration of the second embodiment, the charge and discharge system of the fifth embodiment includes the function of making the bidirectional regulator circuit 10 perform a voltage raising operation when the battery voltage of the secondary battery E2 nears the lowest operation voltage of the set equipment 3 at the time of discharge of the secondary battery E2. Incidentally, in the present embodiment, although the illustration and description of the charge and discharge detecting circuit and the operation and configuration thereof are omitted, the configuration is also equipped similarly to the second embodiment.

In order to realize the aforesaid function, the charge and discharge system of the present embodiment is provided with a battery voltage detection circuit 61 for detecting the battery voltage at the preceding stage of the secondary battery E2. Then, the charge and discharge system is configured to input the detected voltage by the battery voltage detection circuit 61 into the switching control circuit 30, and to make the bidirectional regulator circuit perform a voltage raising operation by the switching control when the battery voltage becomes lower than a certain value at the time of discharge.

As shown in FIG. 14, the battery voltage from which the voltage raising operation is started is set to a first threshold voltage V12, which is somewhat higher than the lowest operation voltage V11 of the set equipment 3. Moreover, if a voltage raising operation at the time of discharge has been once started, then, even if charge has been halfway performed to the secondary battery E2 and the battery voltage has risen in a small measure, the charge and discharge system is configured to continue the voltage raising operation as long as the battery voltage does not exceed a second threshold voltage V13, which is somewhat higher than the first threshold voltage V12 at the time of the next discharge operation.

As described above, by setting a little potential difference between the threshold voltage V13 to stop a voltage raising operation and a threshold voltage V11 to start the voltage raising operation, it is possible to prevent the instability of an operation owing to the fluttering of the operation at the time of the switching of the start and stop of the voltage raising operation.

Moreover, if discharge has continued without shifting to any charge operation, and if the battery voltage reaches the lowest battery voltage V14, then the voltage raising operation is stopped, and the power supply to the set equipment 3 is stopped, in order to prevent the overdischarge of the secondary battery E2.

According to the charge and discharge system of the present embodiment, even if the battery voltage of the secondary battery E2 becomes the lowest operation voltage of the set equipment 3 or less, power supply can be continued until the electric power of the secondary battery E2 has been completely discharged, and the usable time of the set equipment 3 by the secondary battery E2 extends to be useful.

Sixth Embodiment

Figure 15:
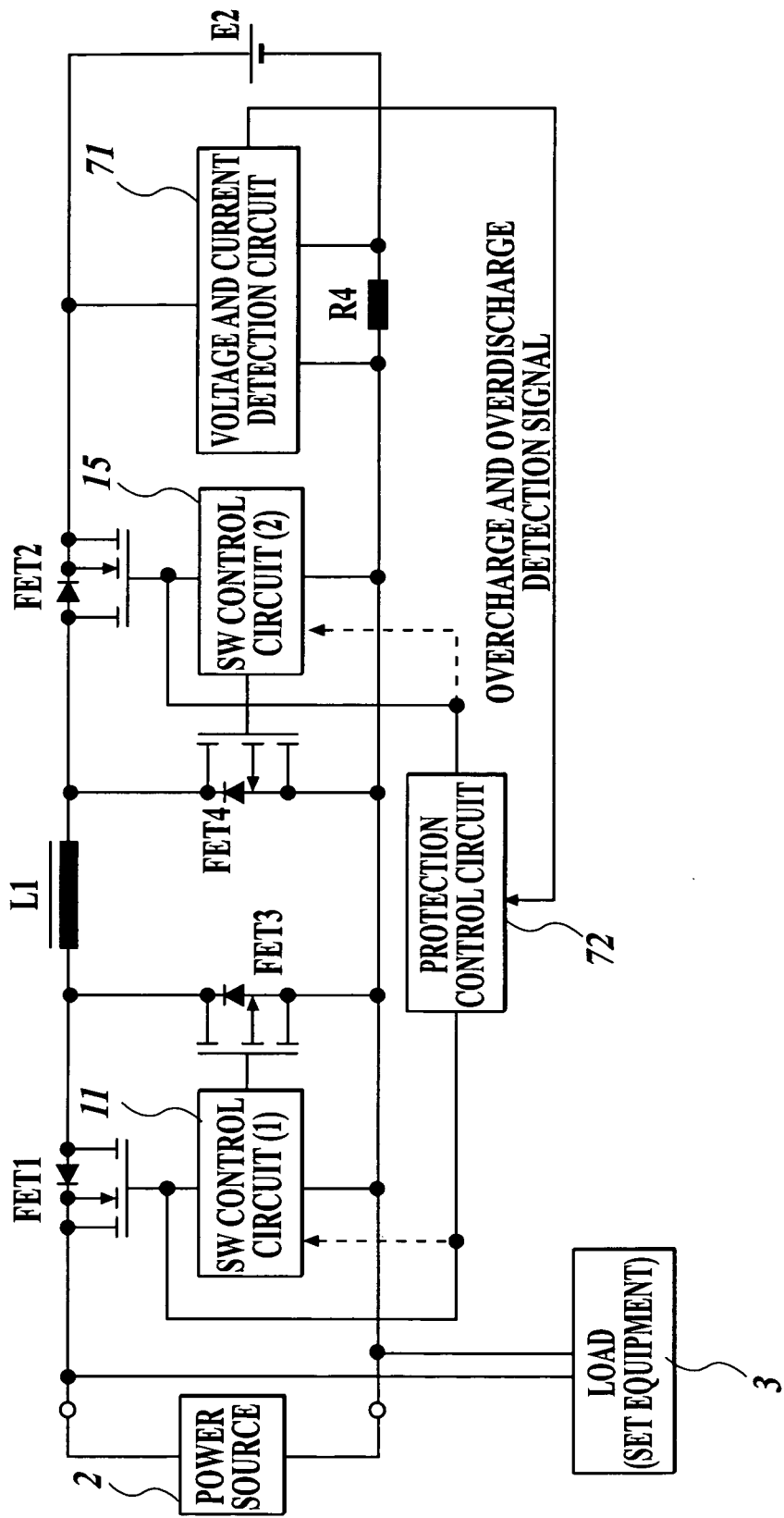
FIG. 15 is a circuit configuration diagram showing a charge and discharge system of a sixth embodiment.

FIG. 15 shows a circuit configuration diagram of a charge and discharge system of a sixth embodiment.

In addition to the configuration of the second embodiment, the charge and discharge system of the sixth embodiment includes the protection function of preventing the overcharge and overdischarge of the secondary battery E2. Also in the present embodiment, although the illustration and description of a charge and discharge detecting circuit and a switching control circuit to perform switching between charge and discharge are omitted, the configuration of them is also equipped similarly to the second embodiment.

In order to realize the protection function, the charge and discharge system of the present embodiment is provided with a voltage and current detection circuit 71 for detecting a battery voltage and charge and discharge currents at the preceding stage of the secondary battery E2, and a protection control circuit 72 for intercepting the connection of the secondary battery E2 from the set equipment 3 and the power source device 2 when the voltage and current detection circuit 71 outputs detection signals of overcharge and overdischarge.

The protection control circuit 72 is configured to perform the interception of the secondary battery E2 by compulsively turning off, for example, either of the transistors FET1 and FET2, which are serially connected between the power source device 2 and the secondary battery E2, among the composing elements of the bidirectional regulator circuit. For example, overcharge and overdischarge are prevented by turning off the transistor FET1 at the time of the overcharge and by turning off the transistor FET2 at the time of the overdischarge.

Incidentally, a switch element dedicated for intercepting the charge currents and discharge currents of the secondary battery E2 may be provided to turn off the switch element.

Moreover, the protection control circuit 72 may not turn off the transistors FET1 and FET2 by outputting drive signals to turn off the transistors FET1 and FET2 to the gate terminals of the transistors FET1 and FET2 directly, but may turn off the transistors FET1 and FET2 through the first and second Sw control circuits 11 and 15 as shown by dotted lines in FIG. 15.

By such a configuration, it becomes possible to prevent the overcharge and overdischarge of the secondary battery E2 to make the charge and discharge system be one having high safety.

Seventh Embodiment

Figure 16:
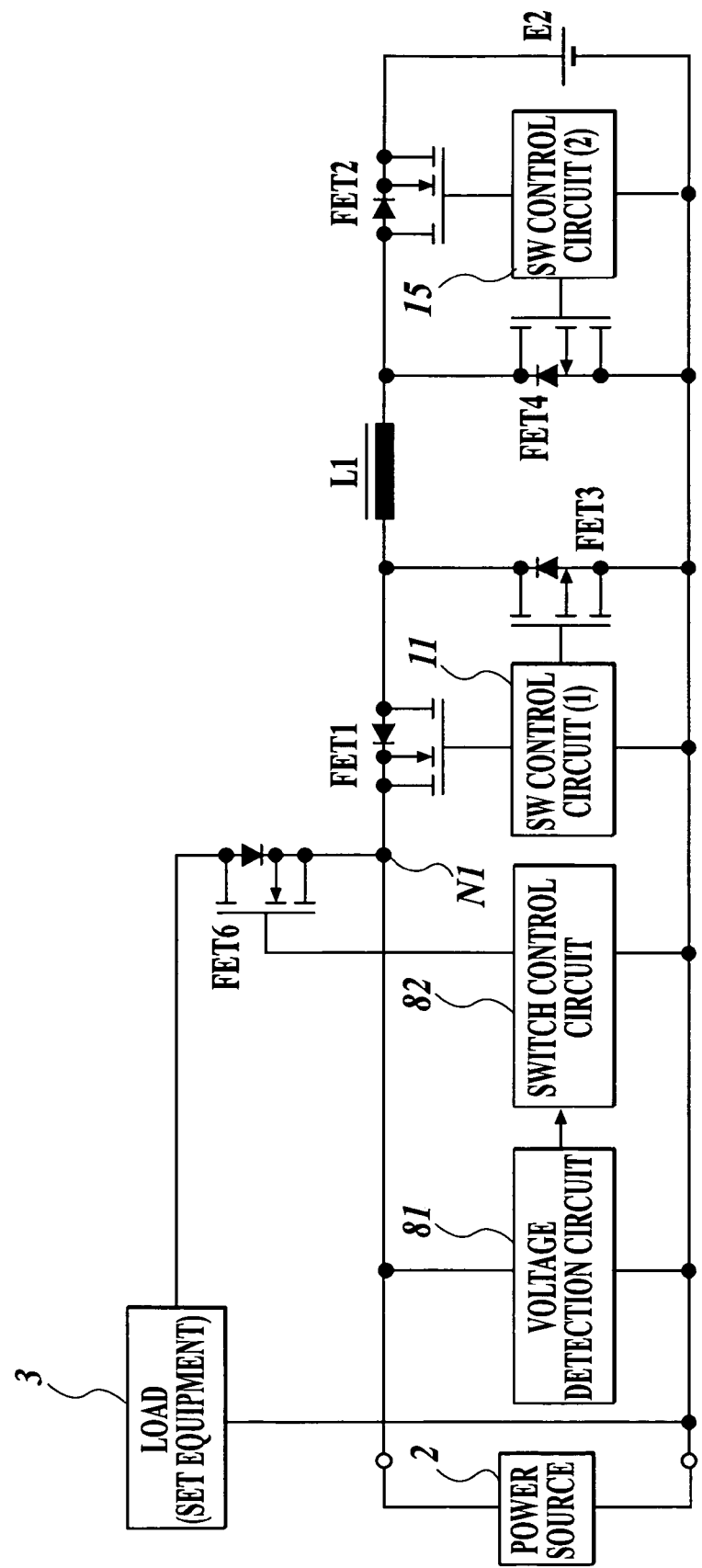
FIG. 16 is a circuit configuration diagram showing a charge and discharge system of a seventh embodiment.

FIG. 16 shows the circuit configuration diagram of a charge and discharge system of a seventh embodiment.

In addition to the configuration of the second embodiment, the charge and discharge system of the seventh embodiment includes the protection function of stopping voltage output when the output voltage to the set equipment 3 exceeds the maximum rated voltage thereof. Also in the present embodiment, although the illustration and description of the charge and discharge detecting circuit and the switching control circuit to perform the switching between a charge operation and a discharge operation are omitted, also the configuration of them is provided like the second embodiment.

In order to realize the protection function mentioned above, the charge and discharge system of the present embodiment includes a switch element FET6 provided between a node N1 of the power source terminal and the bidirectional regulator circuit, and the set equipment 3; a voltage detection circuit 81 for detecting an output voltage; and a switch control circuit 82 for performing the on-off control of the switch element FET6 based on the detected voltage by the voltage detection circuit 81.

By such a configuration, for example, if the power source device 2 of a voltage higher than the maximum rated voltage of the set equipment 3 is connected, and if a high voltage is output by a malfunction of the bidirectional regulator circuit, then the switch element FET6 is turned off to enable the set equipment 3 to be protected.

Eighth Embodiment

Figure 17:
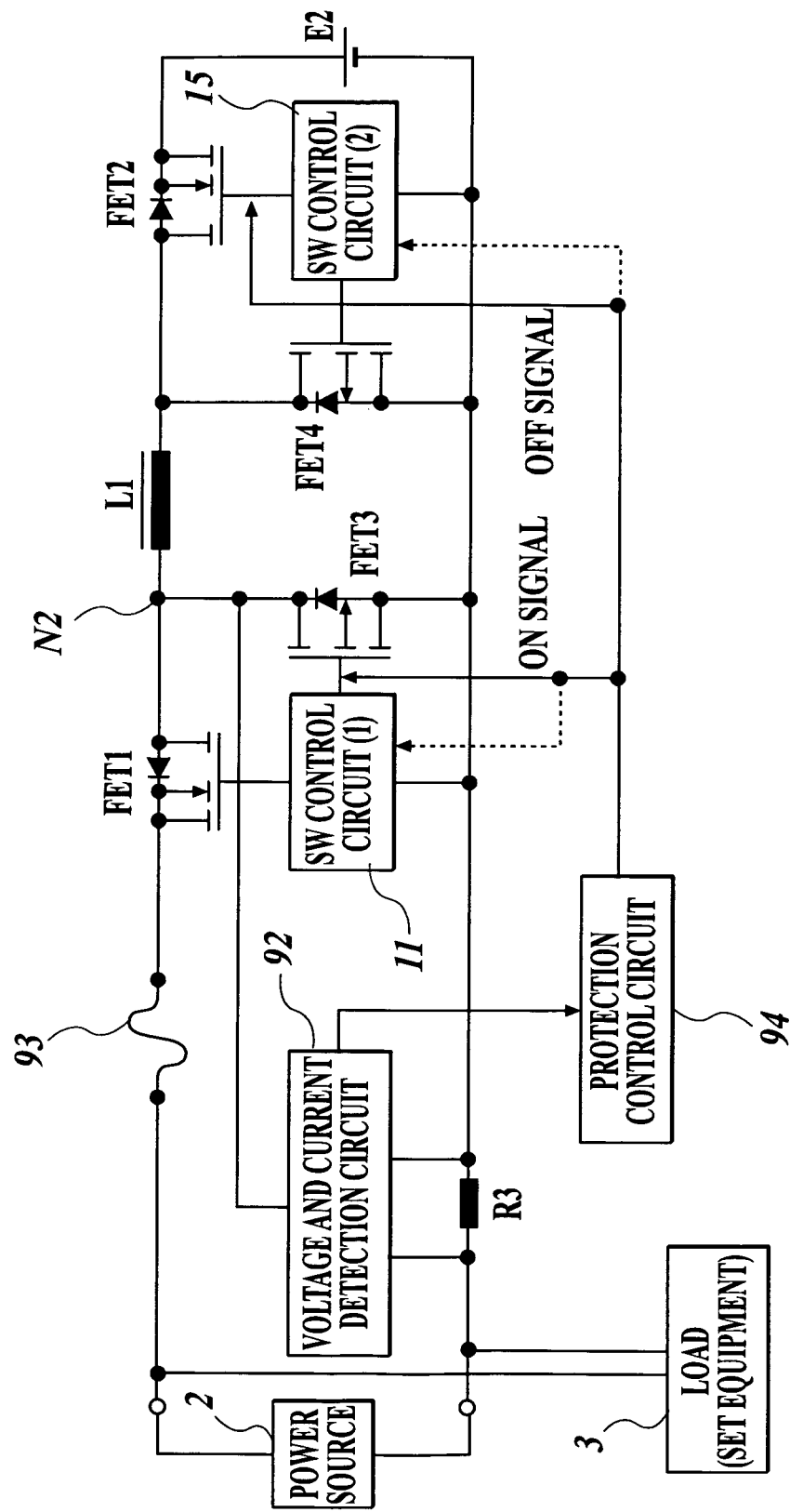
FIG. 17 is a circuit configuration diagram showing a charge and discharge system of an eighth embodiment.

FIG. 17 shows the circuit configuration diagram of a charge and discharge system of an eighth embodiment.

In addition to the configuration of the second embodiment, the charge and discharge system of the eighth embodiment includes the second protection function to cut a fuse 93 to intercept the input of an abnormally high voltage into the secondary battery E2 completely when the abnormally high voltage is input from the power source terminal. Also in the present embodiment, although the illustration and description of a charge and discharge detecting circuit and a switching control circuit for performing the switching between a charge operation and a discharge operation are omitted, the configuration of them is also provided similarly to the second embodiment.

In order to realize the second protection function mentioned above, the charge and discharge system of the present embodiment includes the fuse 93 connected between the power source terminal and the bidirectional regulator circuit in series with them, a voltage and current detection circuit 92 for detecting an input voltage and an input current, and a protection control circuit 94 for controlling the transistors FET1, FET3, and FET2 of the bidirectional regulator circuit and to be able to cut the fuse 93.

In the charge and discharge system of the present embodiment, the transistor FET1 is first turned off and the protection operation for intercepting the input of an excessive voltage works by an ordinary protection function (first protection function) of the bidirectional regulator circuit when the excessive voltage is input. However, if further larger abnormal voltage is input, then the charge and discharge system may be in an out-of-control state, in which, for example, the transistor FET1 is destroyed, and the inputs of the abnormal voltage and an abnormal current pass through the transistor FET1 to be input into the charge and discharge system sometimes even if the protection operation by the transistor FET1 is executed.

The charge and discharge system of the present embodiment is configured so that the second protection function by the cut of the fuse 93 may operate in such a case.

Accordingly, the voltage and current detection circuit 92 used in the second protection function is configured to detect the voltage at a potential point N2, which is at a subsequent stage to the transistor FET1, which is turned off in the first protection function.

An ordinary fuse, which is cut when a current flowing through the fuse exceeds a limited current, a resistance fuse, which includes a resistance component and is cut when the power input into the fuse exceeds a predetermined input power, and the like, can be used as the fuse 93.

If the voltage and current detection circuit 92 detects an input that exceeds a limited voltage or a limited current, the protection control circuit 94 outputs a signal to compulsively turn on a transistor FET3 connected between the transistor FET1 and the ground. Thereby, an excessive current is made to flow through the transistor FET1, which is out of control and is in a conducting state, and the on-operated transistor FET3 to be able to cut the fuse 93.

At the same time, the protection control circuit 94 outputs a signal to compulsively turn off the transistor FET2 connected in series with the secondary battery E2. Thereby, it is avoided that a discharge current of the secondary battery E2 flows through the transistor FET3 turned on for cutting the fuse 93, and the overdischarge of the secondary battery E2 can be prevented.

As described above, according to the charge and discharge system of the present embodiment, it is possible to intercept the input of an abnormal excessive voltage by cutting the fuse 93 without feeding the excessive current to the secondary battery E2 when the excessive voltage is input into the charge and discharge system, and consequently it is possible to attain the securing of higher safety.

Incidentally, although the protection operation control circuit 94 directly controls the transistors FET2 and FET3 in the bidirectional regulator circuit to cut the fuse 93 or to prevent the overdischarge of the secondary battery E2 in the present embodiment, the protection operation control circuit 94 may output a signal to the first and second SW control circuits 11 and 15 for controlling the transistors FET2 and FET3 similarly through the first and second SW control circuits 11 and 15, as shown by dotted lines in FIG. 17.

Moreover, although the present embodiment uses the transistors FET2 and FET3 in the bidirectional regulator circuit for performing the cut of the fuse 93 and preventing the discharge current of the secondary battery E2 at that time, dedicated transistors may be provided to perform these pieces of processing.

Ninth Embodiment

Figure 18:
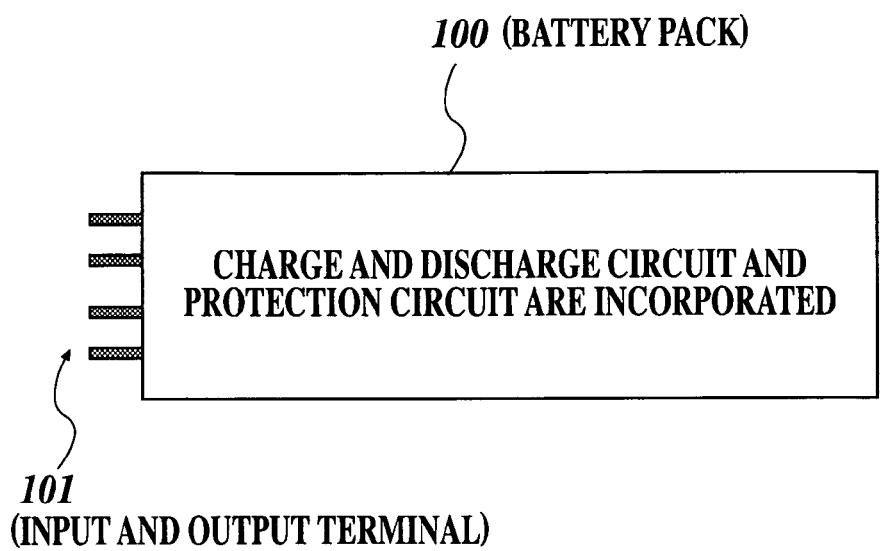
FIG. 18 is a view showing an example of an embodiment according to the battery pack of the present invention.
Figure 19:
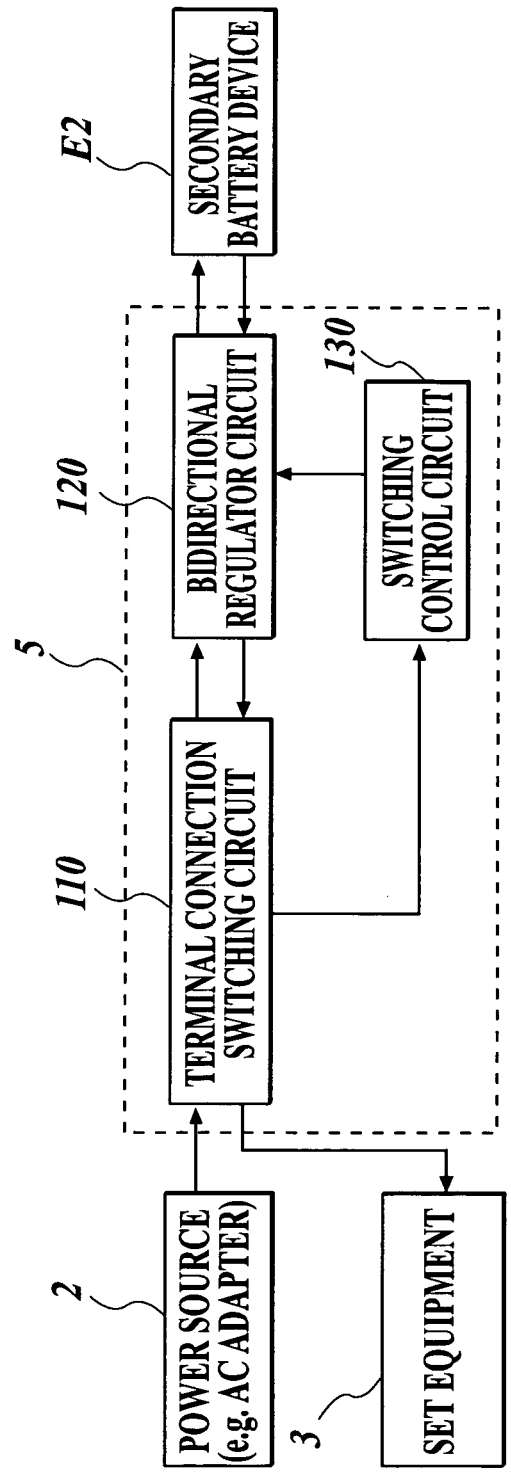
FIG. 19 is a block diagram showing an example of a conventional charge and discharge system.

FIG. 18 is a view showing an example of an embodiment according to a battery pack of the present invention.

The battery pack 100 of the present embodiment incorporates a circuit for charge and discharge according to one of first to eighth embodiments in a package incorporating the secondary battery E2.

It is needed for the charge and discharge circuit to be provided with the reactor L1 and resistances to detect a voltage and a current, but the elements having small volumes of the degree of enabling the elements to be mounted on a surface can be used as those components. Consequently, the charge and discharge circuit can be incorporated with scarcely enlarging the package. Moreover, the circuits in the control system and the transistors for controlling a current and a voltage can be provided by being integrated in a one-chip or two-chips of semiconductors.

Input and output terminals 101 are shown as the ones composed of two terminals to be connected to the power source device 2 and two terminals to be connected to the set equipment 3, but these four terminals may be integrated to two terminals by being commonly used as long as the charge and discharge circuit is the one capable of sharing the terminals to be connected to the power source device 2 and the set equipment 3.

According to the battery pack 100 mentioned above, it is possible to configure a battery having the function of voluntarily switching the operation thereof between a charge operation and a discharge operation at suitable timing according to the connection state with an external device and a power source device and the charge state of the secondary battery E2, and consequently the battery function thereof can be applied to various uses easily.

In the above, the present invention has been described based on the embodiments, but the present invention is not limited to the aforesaid embodiments. For example, a plurality of or the whole of the additional functions shown in the third to eighth embodiments may be collectively provided to one charge and discharge system. In addition, the kinds of the secondary battery, the details of the circuit configurations and operation contents, and the like, which have been shown in the embodiments concretely, can be suitably changed without departing from the sprit and scope of the invention.

INDUSTRIAL APPLICABILITY

The present invention can be used for, for example, a charge and discharge circuit of a secondary battery to perform the charge and discharge of the secondary battery, such as a lithium ion battery, and a battery pack made by packaging the secondary battery.

The invention claimed is:

1. A charge and discharge circuit of a secondary battery, the charge and discharge circuit being capable of charging the secondary battery by a power source voltage and of supplying power from the secondary battery to an external device, the charge and discharge circuit comprising:
   a bidirectional regulator capable of adjusting a current or a voltage in both of a charge direction of feeding the current to a secondary battery side and a discharge direction of feeding the current from the secondary battery to an external device side;
   a charge and discharge detecting circuit for detecting a direction of the current flowing in the secondary battery;
   a switching control circuit for switching an operation direction of the bidirectional regulator into the charge direction or the discharge direction based on a detection result of the charge and discharge detecting circuit; and
   a battery voltage detection circuit for detecting a battery voltage of the secondary battery;
   wherein the charge and discharge detecting circuit includes:
      one or a plurality of field-effect transistors serially connected on a current pathway on which a charge current and a discharge current of the secondary battery flow;
      a section for applying bias voltages to gate terminals so that both end voltages of the field-effect transistors become predetermined voltages; and
      a comparison circuit for mutually comparing both the end voltages of the field-effect transistors;
   wherein the section for applying bias voltages makes resistances between sources and drains of the field-effect transistors small when current flowing through the field-effect transistors is large, and makes the resistances large when the current is small;
   wherein when the battery voltage detection circuit detects that the battery voltage of the second battery is lower than a first threshold voltage which is higher than a lowest operation voltage of the external device during discharge from the secondary battery to the external device, the bidirectional regulator starts a voltage raising operation to perform power supply to the external device; and
   wherein when the battery voltage direction circuit detects that the battery voltage of the secondary battery exceeds a second threshold voltage which is higher than the first threshold voltage during discharge from the secondary battery to the external device, the bidirectional regulator stops the voltage raising operation.

2. The charge and discharge circuit according to claim 1, wherein:
   the bidirectional regulator is configured to be able to perform a voltage lowering operation by switching control for adjusting an output by making the transistors perform switching operations, and by linear control for adjusting the output by continuously changing on-resistances of the transistors, and
   the charge and discharge circuit is provided with a control section for switching a control system at the time of the voltage lowering operation of the bidirectional regulator to the switching control or the linear control based on at least one of the power source voltage and the battery voltage of the secondary battery.

3. The charge and discharge circuit according to claim 1, further comprising:
   an abnormality detection circuit for detecting at least one of overcharge and overdischarge of the secondary battery; and
   a control circuit for intercepting at least one of an input and the output of the bidirectional regulator based on the detection of the abnormality detection circuit.

4. The charge and discharge circuit according to claim 1, further comprising:
   a fuse provided on the current pathway for connecting the power source voltage and the secondary battery;
   a voltage and current detection circuit for detecting the power source voltage and an input current; and
   a switch element serially connected to the fuse;
   wherein when the power source voltage or the input current exceeds a limiting value, the switch element is turned on to cut the fuse.

5. The charge and discharge circuit according to claim 4, wherein the switch element is configured by applying the transistors for the output adjustment of the bidirectional regulator circuit thereto.

6. A battery pack comprising:
   a secondary battery; and
   the charge and discharge circuit of the secondary battery according to claim 1;
   wherein the secondary battery and the charge and discharge circuit are integrated by being set up in a package.

* * * * *